United States Patent [19]

Baker

[11] Patent Number: 4,575,668
[45] Date of Patent: Mar. 11, 1986

[54] CONTROLLER FOR PROVIDING PWM DRIVE TO AN A.C. MOTOR

[75] Inventor: Robert W. Baker, Westerville, Ohio

[73] Assignee: Liebert Corporation, Columbus, Ohio

[21] Appl. No.: 629,093

[22] Filed: Jul. 9, 1984

[51] Int. Cl.⁴ .............................................. H02P 5/40
[52] U.S. Cl. .................................... 318/811; 323/282; 323/286
[58] Field of Search ................ 318/811; 323/282–286, 323/901

[56] References Cited

U.S. PATENT DOCUMENTS

| | | | |
|---|---|---|---|
| 3,585,491 | 6/1971 | Petersen | 323/286 |
| 3,967,173 | 6/1976 | Stich | 318/811 |
| 4,030,024 | 6/1977 | Chambers | 323/282 |
| 4,123,682 | 10/1978 | Gilmore et al. | 318/811 |
| 4,233,558 | 11/1980 | Gaertner | 323/286 |
| 4,307,440 | 12/1981 | Inoue et al. | 323/901 |
| 4,409,534 | 10/1983 | Bose | 318/811 |
| 4,420,700 | 12/1983 | Fay et al. | 323/282 |
| 4,458,199 | 7/1984 | Evans et al. | 323/286 |
| 4,491,768 | 1/1985 | Slicker | 318/811 |
| 4,508,976 | 4/1985 | Hickman et al. | 307/270 |

Primary Examiner—David Smith, Jr.
Attorney, Agent, or Firm—Mueller and Smith

[57] ABSTRACT

A controller for providing PWM drive to an inductive load incorporating an input rectifier bridge (24) the output of which is filtered by capacitors (106, 108) and which includes input impedance (116, 118) for limiting start-up current surges. A by-pass network (124) controlled from a high voltage sensor circuit (32) controls the by-pass network. The sensor circuit also provides an enablement signal (40) to a pulse width modulation circuit (42). A low voltage power supply (36) is coupled with the output (26) of the rectifier and filter function (24) to supply isolated power to the discrete driver networks of a driver circuit (48). The driver networks are controlled from the pulse width modulation circuit which, in turn, is controlled from a microprocessor (68). The drivers provide drive to three, phase designated transistor pairs of an inverter switching bridge (50) which is supplied power from the rectifier and filter circuit (24).

28 Claims, 11 Drawing Figures

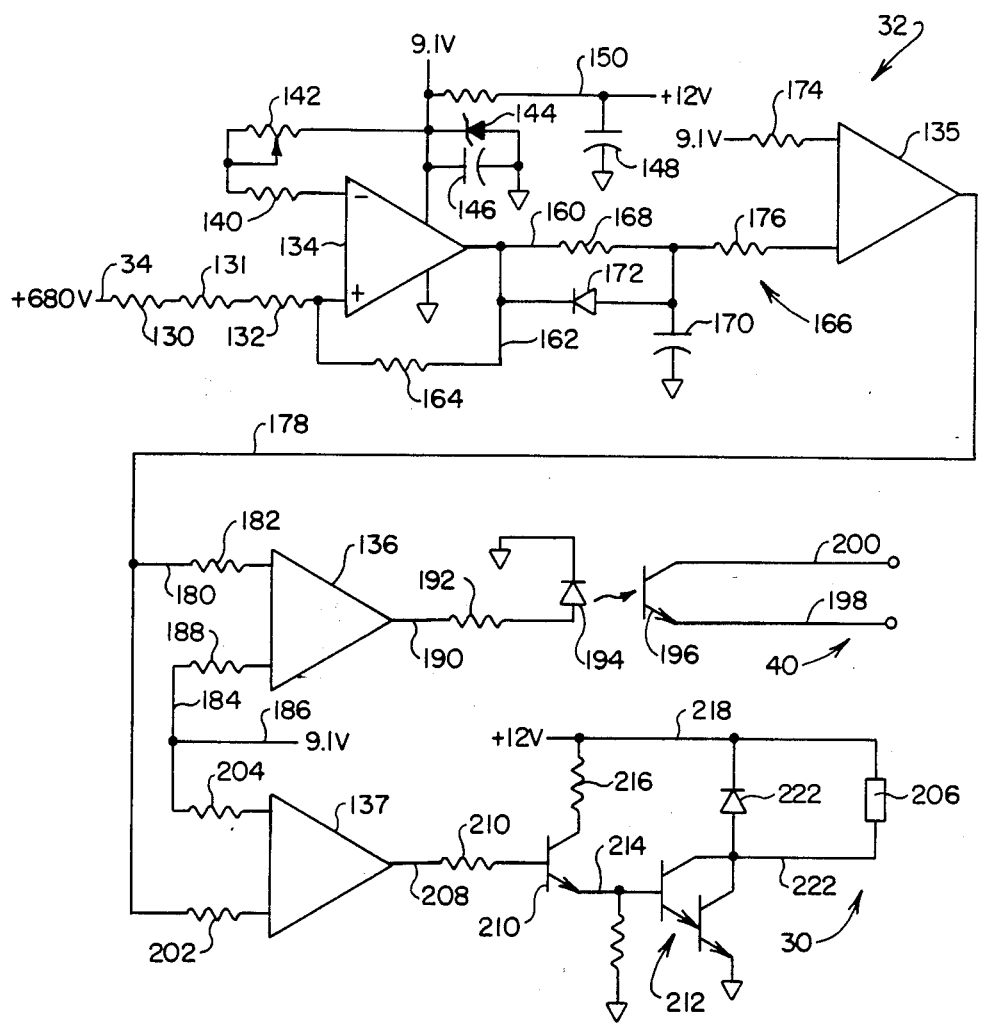
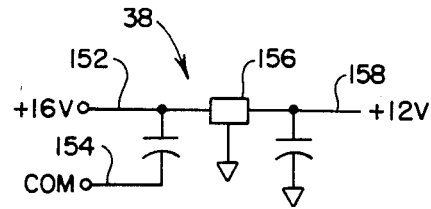
FIG. 5
FIG. 5A

CONTROLLER FOR PROVIDING PWM DRIVE TO AN A.C. MOTOR

BACKGROUND OF THE INVENTION

Heating and cooling systems for structures housing industrial and business functions now often contain internally disposed rooms or confined spaces wherein there is provided a very precisely controlled environment such to assure the proper performance of complex and highly sensitive equipment such as computers. A specialized environmental control generally will include refrigeration and/or air conditioning components as well as humidity regulation devices combined with sensing systems which are called upon to operate continuously on a year-round basis. Generally, the refrigeration or air conditioning equipment utilized for this function is dedicated and involves the operation of compressor components in conjunction with evaporators, expansion devices and condensers. The latter, condensing function generally is one which is located to carry out a heat exchange operation with the air of an outdoor, ambient surrounding. Inasmuch as a significant number of these dedicated installations are located in climates having seasons of varying winter and summer temperatures, approaches have been made to take advantage of cooler temperatures to lower energy expenditures otherwise required for the systems. For example, in one approach, advantage has been taken of seasonally lower outdoor or ambient temperatures by a controlled mixing of cooler outdoor air with recirculated air within the confined space. This commingling of air permits an intermittent deactivation of energy consumming refrigeration components of the environmental control systems.

One disadvantage attendant with the use of outside air to contribute to cooling stems from the general tendency of industry to locate computer rooms and the like well within the internal regions of buildings as noted above. As a consequence, access to outside air can be achieved only through the use of extensive and bulksome ducting, a requirement rendering the otherwise achieved energy conservation impractical and economically unsound. However, should the location disadvantage be overcome, the typically encountered variations in ambient air humidity have been found to counteract the energy gains from utilizing outdoor air and lower temperature, inasmuch as a greater consumption of energy is required to carry out humidification and dehumidification than initially conserved in using the outside air. This outside air also will contain undesirable contaminants such as dust and the like.

The first practical system introduced to industry where an effective energy conservation was achieved taking advantage of lower outside or ambient air temperatures is described in U.S. Pat. No. 3,525,385 under the inventorship of Ralph C. Liebert. The system provides an outdoor heat exchanger which operates in conjunction with a liquid heat exchanging medium, such as glycol or the like. This glycol is pumped through conduits into the building retaining the enclosed air conditioned region and at which point the fluid is utilized both to provide heat exchange within the condenser units of the refrigeration system and, alternately, to provide cooling through the use of a liquid cooling coil interposed within the air flow of the internally disposed air conditioning equipment. Thus, as outdoor temperatures drop below predetermined levels, i.e. about 35° F., full advantage is taken of those lower levels to accommodate the heat loads imposed from computer equipment and the like.

U.S. Pat. No. 4,271,678 under the inventorship of Ralph C. Liebert describes an improvement to the above noted system wherein advantage is taken of the cooling capabilities of outdoor air at temperatures between 35° F. and 65° F. The patent looks to the average temperature data available for most American cities and notes that in geographical areas currently comprising about 75% of industry and commerce, outdoor temperatures within that range occur for at least one-half of a given year.

In a copending application for United States patent entitled "Energy Efficient Air Conditioning System Utilizing a Variable Speed Compressor and Integrally Related Expansion Valves" by Sillato and Baer, Ser. No. 565,407, filed Dec. 27, 1983, and assigned in common herewith, an extremely efficient air conditioning and/or refrigeration system is described which shows a combination of a variable speed compressor with integrally related expansion components which perform for the instant purpose of controlling the environment of computer rooms and the like in a manner achieving efficiencies not heretofore realized. With that system, the stepped, on and off operation of the compressor is substantially reduced to, in turn, minimize strain otherwise asserted upon the equipment. To achieve a requisite performance of this system, a controller generally referred to as an inverter drive is required which is capable of reliable long-term performance and which enjoys a maximum of efficiency. In the latter regard, the inverter is called upon to assert drive to an inductive compressor motor providing for optimum performance at speeds as low as 20 percent of nominal without the development of phenomena such as motor slip or the like. Further, the inverter must be fabricable for efficient operation in highly compact form so as to be mountable with the air conditioning equipment which it drives without imposing any significant change in cabinetry size.

Because the environments of computer rooms and the like, for the most part, are of themselves monitored by microprocessor controlled components, the inverter drives now contemplated must also be controllable from the firmware or software programs of the processors. Further, the inverter drives or controllers must exhibit a very high reliability, working off a conventional three-phase 480 volt a.c. input line. For example, the inverter drives should be capable of accommodating short term single phase conditions and must be immune to any of a wide variety of transients which are encountered either from line sources or from coupled motor defects. Additionally, to achieve acceptable cost factors for the entire systems, the controller or inverter structures must be fabricable at acceptable price levels, for example, incorporating designs which advantageously lessen ampacity requirements. In the latter regard, the controllers must be capable of accommodating for start-up phenomena which generally involves encounters with very high level surge currents.

SUMMARY

The present invention is addressed to a controller for providing pulse width modulated drive to an a.c. motor. Having very high efficiency, the controller exhibits dismissible slip characteristics at low speeds, is capable of continued performance under imposed short term single phase conditions and the like, and provides desirable accommodation to start-up current surges and similar phenomena. The design of the inverter ideally permits its overall packaging in compact form, for example, such that it may be mounted within conventional air conditioning or refrigeration cabinetry. Where the controller is utilized in conjunction with systems which are themselves microprocessor or computer controlled, it may be controlled directly from the software or firmware programs with respect to system enablement, drive frequency adjustment and modulation depth adjustment. Thus, the drive characteristics for the compressor function of a refrigeration system may be controlled using software concepts. As is apparent from the foregoing, the controller of the invention advantageously exhibits a broad utility, and is capable of being employed in conjunction with a wide variety of systems requiring variable speed a.c. motor drive.

Another feature and object of the invention is to provide a controller developing pulse width modulated polyphase drive to an a.c. motor which includes a high voltage rectifier connectable with an a.c. source for providing a d.c. power output and which further incorporates a low voltage power supply which includes a step down impedance coupled with the d.c. power output for developing a d.c. output of selectively reduced voltage level. A gate controlled series regulator is provided having an input for receiving the reduced voltage d.c. output and a first gate which is responsive to a bias signal asserted thereto for deriving a pre-regulated output. A gate input arrangement is coupled with the series regulator for providing a requisite bias at the first gate and a shunt regulator is utilized having an input coupled with the gate input and having a second gate which is controllable to selectively effect the shunting of the biasing signal from the series regulator first gate. An arrangement for providing a reference output of predetermined voltage level operates in conjunction with a gate control which is coupled to the second gate and serves for response both to the reference output and to the preregulated output for controlling the second gate to regulate the series regulator. A first oscillator is coupled with the preregulated output for deriving a time varying output and a transformer is provided having a primary winding responsive to the time varying output and having mutually isolated secondary windings for providing discrete, phase designated, time varying supply outputs. Discrete, mutually isolated low voltage rectifiers are coupled with each of the mutually isolated secondary windings for deriving discrete, phase designated, positive and negative d.c. supply outputs. A switching bridge is coupled with the d.c. power output and includes discrete, phase designated paired transistor switching stages, each such stage having dual inputs responsive to selectively applied on-drive and off-drive signals to provide a polyphase motor drive at the outputs thereof. The control circuit provides discrete phase designated pulse width modulation control outputs and a driver circuit having discrete driver networks, each having dual outputs coupled with the dual inputs of corresponding ones of the transistor switching stages are provided. Each driver network has a dual power supply input coupled with the corresponding one of the discrete, phase designated positive and negative d.c. supply outputs and is responsive to a corresponding discrete, phase designated pulse width modulation control output to derive the on-drive and off-drive signals which are applied to the transistor switching stage inputs.

Another object of the invention is to provide a pulse width modulated polyphase inverter for providing drive to an inductive load from an a.c. source which includes a high voltage rectifier connectable with that source for providing a rectified output and a filter capacitor arrangement connected across the rectified output to develop a filtered d.c. output. Start-up impedance means is coupled intermediate the filter capacitor and the rectifier for dissipating currents applied thereto from the rectifier. A by-pass network is coupled across the start-up impedance which is actuable to provide a shunt thereacross. A voltage sensing circuit including a comparison network which is responsive to the voltage level of the filtered d.c. output and to the level of a reference voltage derives a power signal in the presence of a substantial equality of these levels. An actuator is provided which is responsive to the power signal for actuating the by-pass network. A low voltage power supply is provided which is responsive to the filtered d.c. output and derives discrete phase designated positive and negative d.c. supply outputs. A switching bridge is coupled with the filtered d.c. output which includes discrete, phase designated paired transistor switching stages, each such stage having dual inputs responsive to selectively applied on-drive and off-drive signals to develop a polyphase drive at the outputs thereof. A control circuit is responsive to an enablement signal for deriving discrete phase designated pulse width modulation control outputs and a driver circuit including discrete driver networks is provided, each such network having dual outputs coupled with the dual inputs of a corresponding one of the transistor switching stages, each driver network having dual power supply inputs coupled with a corresponding one of the discrete phase designated positive and negative d.c. supply outputs and responsive to a corresponding discrete, phase designated pulse width modulation control output to derive the on-drive and off-drive signals which are applied to the transistor switching stage inputs. An enabling network may be provided which is responsive to the voltage sensing power signal for generating enablement signals which are applied to the control circuit.

Another object of the invention is to provide a controller for providing pulse width modulated drive to an inductive load which comprises a high voltage rectifier connectable with an a.c. source for providing a d.c. power output of first and second polarity and a low voltage power supply is included for deriving phase designated supply outputs of first and second polarity. A switching bridge is coupled with the d.c. power output which includes discrete, phase designated, paired transistor switching stages, a first transistor switching stage of a said pair having emitter and collector terminals coupled, respectively, to an output to the load and to the power output of first polarity. The switching stage has a base responsive to an on-drive signal to effect conduction across the terminals. The second transistor stage of the pair has emitter and collector terminals coupled, respectively, to the power output of second polarity and the output to the load and has a base which is responsive to an on-drive signal to effect conduction across the terminals. Each switching transistor stage has a free-wheeling diode and a snubber network coupled across its emitter and collector terminals and each snubber network includes a capacitor which is coupled with the parallel combination of a diode and a discharge resistor which, in turn, are connected between the collector terminal and capacitor. A current limiting impedance is coupled intermediate the capacitor and the emitter terminal of the switching stage. The control circuit provides discrete phase designated pulse width modulation control outputs and a driver circuit is providing having discrete driver networks, each corresponding to a unique transistor switching stage and each driver network having an on-drive output switching stage actuable from an off to an on state to assert an on-drive signal and an off-drive output switching stage actuable from an off to an on state to assert an off-drive signal. Each driver output stage is coupled with the base of the corresponding transistor switching stage and each driver network is coupled to a low voltage power supply output of first and second polarity and has control switching responsive to the control circuit control outputs for selectively actuating the on-drive output stage to an on state while maintaining off-drive in an off state an for selectively actuating the off-drive output stage to an on state when the on drive output stage is in an off state.

Another object of the invention is to provide a control system serving to provide pulse width modulated drive to an a.c. motor which includes a high voltage rectifier connectable with an a.c. source to develop a d.c. power output. A low voltage power supply responds to the d.c. power output to derive discrete, isolated d.c. supply outputs and a switching bridge is coupled with the d.c. power output which includes discrete, phase designated paired transistor switching stages, each stage having inputs responsive to selectively applied drive signals to provide a polyphase motor drive at the outputs thereof. A driver circuit is provided having discrete driver networks, each having a supply input coupled with a select one of the d.c. supply outputs and a drive output coupled with a select switching bridge input, each driver network being responsive to pulse width modulation control signals applied to an input thereof for applying the drive signals to the select switching bridge input. A control circuit is provided including a pulse width modulation integrated circuit having discrete outputs coupled with selected driver network inputs and which is responsive to a signal at first frequency applied to a first input thereof to generate corresponding motor frequency defining pulse width modulated signals at these discrete outputs and is responsive to the presence of an enable signal applied to a second input to carry out signal generation. An oscillator is incorporated with the control circuit for generating predetermined frequency signals and a first programmable counter having a first input coupled for response to the predetermined frequency signals is provided which has an output coupled with the integrated circuit first input for the purpose of applying the first frequency signals thereto. The programmable counter also incorporates a multi-position programming input which responds to an implied multi-bit logic signal for effecting a selection of the first frequency signal. A processor is provided having a multi-bit output coupled with the multi-position programming input and responds to a sensed environmental parameter for deriving and applying the multi-bit logic signal.

Other objects of the invention will, in part, be obvious and will, in part, appear hereinafter.

The invention, accordingly, comprises the apparatus and system possessing the construction, combination of elements and arrangement of parts which are exemplified in the following detailed disclosure. For a fuller understanding of the nature and objects of the invention, reference should be had to the following detailed description taken in connection with the accompanying drawings.

BRIEF DESCRIPTION OF THE DRAWINGS

FIG. 5 is a schematic circuit diagram of the high voltage sensor components of the invention;

FIG. 5A is a schematic circuit diagram of a power supply utilized in conjunction with the circuit of FIG. 5;

DETAILED DESCRIPTION

Figure 1:
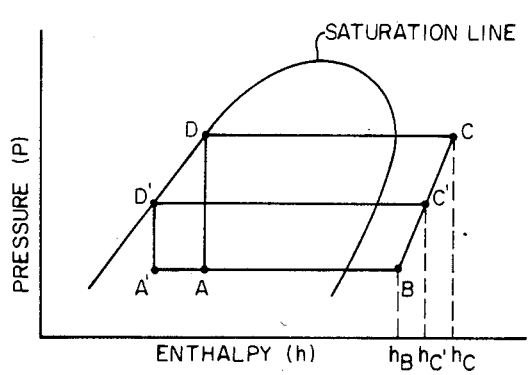
FIG. 1 is a pressure-enthalpy diagram of a refrigeration system with which the controller of the invention may be utilized.

The inverter structure of the instant invention is ideally suited for applications involving temperature and environmental control systems wherein a refrigeration cycle is employed which provides a compressor function of capacity which varies in accordance with heat exchange variations at an associated condenser function. These heat exchange variations can be occasioned both from load changes or altering ambient conditions. While a somewhat broad variety of applications can be envisioned for such systems, one predominant utilization is in conjunction with the control of computer room environments wherein the condenser function is located in an outdoor ambient surrounding. With the provision of a compact and very efficient inverter drive to the compressor motor of such system, efficiencies may be achieved as displayed in conjunction with the conventional pressure-enthalpy diagram of FIG. 1. Assuming the condenser function to be located in a typical moderate climate outdoor atmosphere, operation of the system during normal summer seasonal conditions can be represented by the lines ABCD in the figure. Segment BC of the cycle represents the compressing function under which pressure of refrigerant is increased. The outdoor condensing function, however, as represented by segment CD shows a resultant decrease in the enthalpy of refrigerant to a point on the saturation line corresponding with the particular refrigerant being used. In conventional fashion, the refrigerant is expanded and a pressure drop of the refrigerant results as represented by segment DA. Finally, the refrigerant's transformation from a liquid phase to a vaporous phase through an evaporator function results in an increase in enthalpy of the refrigerant as represented by segment AB of the curve in the figure.

Figure 2:
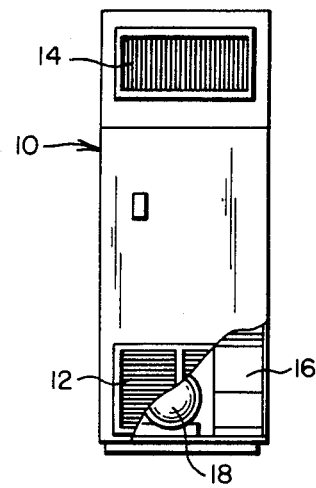
FIG. 2 is a front view of a conventional air conditioning unit having the controller of the invention located in the cooling air flow.

Assuming winter operation, however, colder outdoor air temperatures influence the condenser function which may be taken advantage of by altering the capacity of the compression function and adjusting the expansion function. Where such alterations can be carried out and the compression function, for example, at lower speeds can be efficient in operation, the system then operates on a thermodynamic cycle following lines BC'D'A' in FIG. 1. With a reduced mass flow in conjunction with a properly designed expansion function accommodating lower head pressures, an efficient operation of the compressor may be represented in the latter system path along segment BC'. The energy required of the compressor function under normal summer operation extends between $h_B$ and $h_C$, however, during the noted cooler ambient temperatures, and assuming efficient compressor drive, the energy expenditure becomes $h_B - h_{C'}$. The magnitude of savings can be quite significant. To achieve this desired operation, both inverter performance and coupled a.c. motor performance must be highly efficient. One aspect contributing to this efficiency, for example, where air conditioning implementation is involved, resides in the positioning of the inverter within the air stream of a conventional computer room air conditioner. Referring to FIG. 2, such a conventional air conditioning unit is revealed at 10. Unit 10 is of an up flow air distribution variety which withdraws room air through grating 12 and drives cool air through grating 14. The unit 10 is cut away to reveal an inverter 16 according to the instant invention as well as a motor-compressor assemblage 18. The inverter 16 is located within the air stream of unit 10 for advantageous thermal tempering, i.e. heat removal. It should be apparent, that for applications as shown, the operation of inverter 16 is called upon to be highly efficient, inasmuch as that heat which it generates must be removed by the air conditioning unit 10 from the enclosed environment treated.

Figure 3:
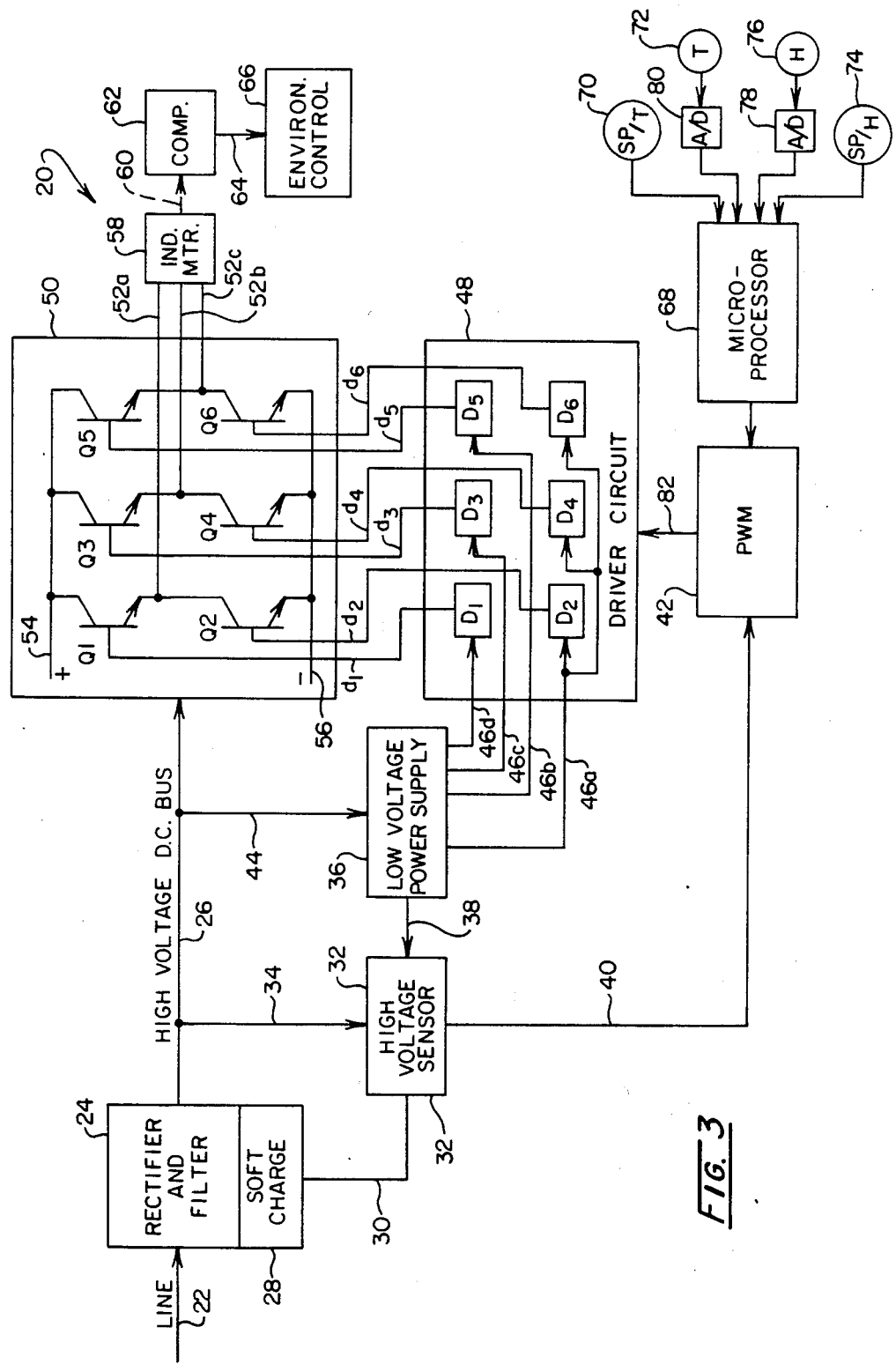
FIG. 3 is a block diagrammatic representation of an air conditioning system utilizing microprocessor control in conjunction with the controller of the invention.

Referring now to FIG. 3, a block diagrammatic overview of the inverter of the instant invention as well as peripheral equipment which may be associated therewith, for example, in conjunction with air conditioning units as at 10 is revealed generally at 20. The arrangement as at 20 operates in conjunction with a typically encountered three-phase, nominal 480 volt, 60 Hertz line input as represented at 22. Power thus inputted at line 22 is rectified utilizing a bridge rectifier and filtered capacitively as represented at block 24 for presentation in d.c. form at about a 680 volt level at d.c. bus 26. For the line power and voltage as contemplated, at any given start-up, currents of excessive levels would be imposed at the filtering function at block 24 and, accordingly, a "soft charge" feature as represented at block 28 is employed which advantageously lessens the ampacity requirements which would otherwise be imposed upon the design for start-up purposes. In effect, resistances are present in series with the filtering capacitors during the first short interval of start-up, following which they are effectively removed from the circuit by a by-pass network. This by-pass network is actuated to provide shunting activity by a power signal applied thereto, as represented by line 30, from a high voltage sensor network represented at block 32. Sensor network 32 monitors the value of filtered d.c. output voltage at bus 26 as represented by line 34, utilizing logic components which are powered from line 38 from a low voltage power supply represented at block 36. Thus, sensor network 32 is not operative until such time as adequate voltage is developed by network 36 from the filtered d.c. output at bus 26. Simultaneously with the assertion of the power signal to the soft charge network 28 through line 30, sensor network 32 also develops a power or power available signal at line 40 through an isolative coupling arrangement. This power signal at line 40 is directed to a pulse width modulation logic network represented at block 42.

The low voltage power supply function 36 taps the high voltage d.c. bus 26 from along line 44 to derive input power. Utilizing this input power, it not only supplies power for logic utilization at sensor network 32, but also provides for isolated, bi-polar power supplies along lines 46a–46d to discrete driver circuits within a driver network represented within block 48. For the most part, the power supplies asserted along lines 46a–46d are coupled to devices which swing through the entire voltage range of the inverter function, i.e. values approaching 700 volts. The switching features of the system are such that this voltage transition is witnessed in less than a microsecond. Thus, unusually vigorous transitions are experienced which the power supplies are called upon to accommodate in mutual isolation.

Low voltage power supply 36 employs a pre-regulator network which regulates the higher filtered d.c. output at bus 26 to a value of about 500 volts. This is achieved through the utilization of a series regulator such as a field effect transistor, the gate of which is controlled in shunt fashion by a shunt regulator, also present as a field effect transistor. The shunt regulator, in turn, is controlled with respect to a reference by a bi-polar device. The regulated output of this preregulation then is directed to a relatively high frequency (80 KHz–100 KHz) oscillator and transformer which provide step down to desired logic level requirements along with appropriate dielectric isolation of the output drives asserted at lines 46a–46d. These drives are bipolar in nature in the interest of supplying positive commutation for the system.

The driver network 48 performs conjointly with the pulse width modulation logic at block 42 to drive an inverter switching bridge network represented at block 50. Network 50 is comprised of three, phase-designated transistor stage pairs which are identified schematically at Q1–Q2, Q3–4, and Q5–Q6. These transistor stage pairs are actuated or commutated by on currents and off voltage biases developed from the driver circuits of network 48, the association of individual driver networks D1–D6 with respective transistor stages Q1–Q6 being represented, respectively, by lines d1–d6.

The transistor stage pairs within inverter switching bridge 50 are interconnected in a form of H bridge configuration to provide a three-phase output represented at lines 52a–52c. Essentially each of the output phases consists of one transistor stage connected between the load and the positive rail 54 of high voltage d.c. bus 26 and a paired transistor stage coupled between the load and the negative rail 56 of bus 26.

Output lines 52a–52c serve to power an a.c. induction motor represented at block 58, which, in turn, as represented by line 60, serves to provide variable speed mechanical drive to a compressor represented by block 62 which is associated as represented by line 64 with an environmental control installation as represented by block 66.

The pulse width modulation carried out in accordance with the instant invention is sinusoidal, utilizing a technique wherein, in effect, an isosceles triangle carrier wave is compared with a desired sinewave signal and the cross-over points of this combination determine points of commutation. This triangular carrier wave is synchronized with the sinusoid and an even integral ratio is maintained to improve harmonic content. The fundamental output voltage of the arrangement can be varied by variation of the modulation index, the latter being the ratio of amplitude of the sinewave to the triangular carrier wave. Control to the logic components of pulse width modulation function 42 is provided from a microprocessor function represented at block 68. Function 68 responds to a variety of monitored parameters such as temperature set point (SP/T) as represented at 70, temperature (T) as represented at 72, humidity set point (SP/T) as represented at 74 and sensed humidity (H) as represented at 76. This latter value as well as the temperature measurement carried out at 72 are converted from analog to digital form as represented, respectively, at blocks 78 and 80.

The output of the pulse width modulation network 42, as represented at line 82, is directed to each of the driver circuits D1–D6 and is associated with these circuits through discrete optical couplers. By logically carrying out frequency variation and modulation depth (RMS volt-second control) the speed of motor 58 may be selectively varied over desirable ranges with maintenance of requisite torque characteristics.

High Voltage Power Supply

Figure 4:
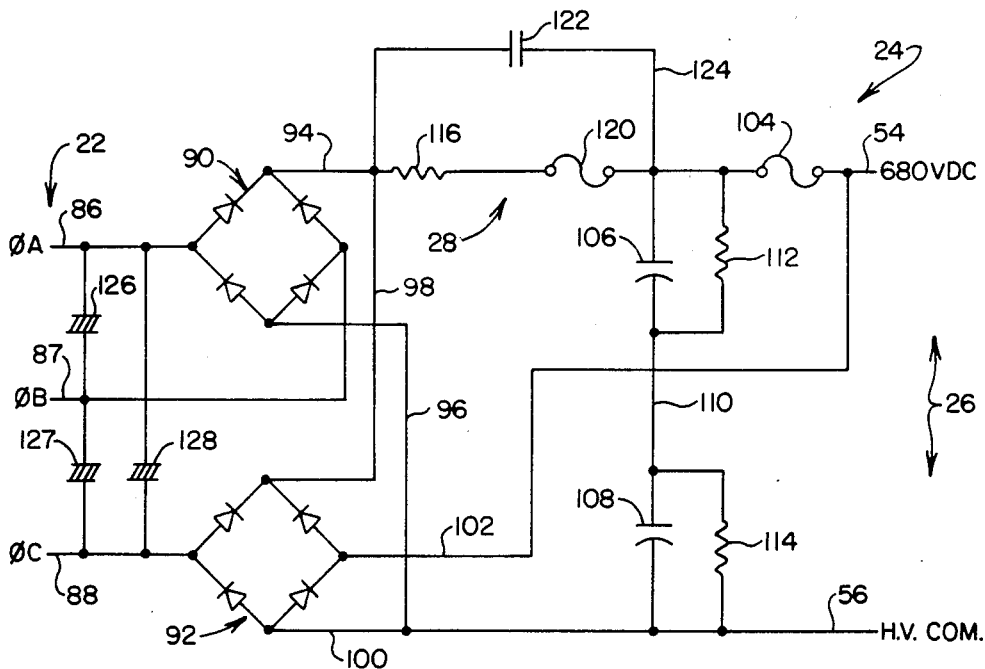
FIG. 4 is a schematic diagram of the rectifier and filter components of the controller of the invention.

Turning to FIG. 4, the high voltage power supply represented in FIG. 3 at blocks 24 and 28 is revealed in enhanced detail. The figure shows that the three-phase (A, B, C) input 22 is presented along lines 86–88 to the inputs of two single phase full wave rectifier bridges 90 and 92. Two of the phase inputs, phases A and B at lines 86 and 87, are coupled with bridge rectifier 90, while phase C at line 88 is coupled to one a.c. leg of bridge 92. The output of bridge 90 is provided at lines 94 and 96, while the corresponding outputs of bridge 92 are presented at lines 98 and 100. The additional input to bridge 92 at line 102 is coupled to the output side of a high speed semiconductor fuse 104 within high voltage d.c. bus 54. Line 102, operating in conjunction with Bridge 92, serves to provide a path for any regenerative energy which may be developed in the system in situations where, for example, fuse 104 is blown.

The rectified output of bridges 90 and 92 is a high voltage pulsating level exhibiting ripple current or distortion which can cause undesirable thermal outputs. To minimize such ripple distortion and, in view of a desirability for the inverter to run essentially in open loop fashion in the interest of stability, filter capacitors 106 and 108 are coupled in series within line 110 extending between lines 94 and 100. These capacitors 106 and 108 are sized or selected having capabilities of accommodating short term single phase operations and, for the exemplary line inputs described above, may, for example, be of a 2400 microfarad, 450 volt electrolytic variety. In order not to overrun the voltage ratings of the capacitors, it is necessary to equalize the voltage across them and, for this purpose, resistor 112 is coupled across capacitor 106, while resistor 114 is coupled across capacitor 108. These resistors serve to accommodate leakage currents in the capacitors. Additionally, resistors 112 and 114 serve to bleed charge off respective capacitors 106 and 108 at such time as the system is turned off. In the latter regard, electrolytic capacitors are known to exhibit a polarizing effect wherein they can reassume a relatively large charge after having been discharged in the course of use.

The soft charge feature 28 of the high voltage power supply is comprised of a resistor function, shown as resistor 116 which, during start-up serves to impose a limitation on excessive in-rush currents otherwise charging capacitors 106 and 108. The resistor 116 will dissipate the applied power at start-up, however, the dissipation is for a short interval. Resistor 116 additionally is coupled in series with a fuse 120, the entire arrangement extending between lines 94 and output rail 54. Once capacitors 106 and 108 are fully charged as determined by the high voltage sensor network 32, the contacts 122 of a relay close a by-pass network represented by line 124 across resistor 116, and fuse 120. Upon closure of contacts 122, the inverter 20 will run at full load, current drawn from capacitors 106 and 108 being replenished without line drop and the power otherwise dissipated by resistor 116 is fully utilized.

Fuse 120 is relatively small scale, for example in the one amp range, and serves to protect the circuit in the event of the failure of one of the capacitors 106 or 108.

The network 24 further is protected against line transients by the presence of three metal oxide varistors 126–128 which are coupled in delta configuration across lines 86–88. As another security measure, fuse 104 serves to protect the system against unusual load conditions, for example conditions where the motor drive to a compressor is mistakenly coupled in signal phase or the like and high currents are generated.

High Voltage Sensor

Turning to FIGS. 5 and 5A, the high voltage sensor network is illustrated in enhanced detail. Line 34, tapping the positive rail 54 of high voltage d.c. bus 26 again is reproduced in the figure and the high voltage carried by this line, for example about 680 volts, is scaled down through three series coupled resistors 130–132 to provide a current input to one operational amplifier 134 of a quad grouping thereof, 134–137. Quad amplifier grouping 134–137 may, for example, be provided as a type LM3900 marketed by National Semiconductor Corp.

Amplifier 134 is the principal component of a comparison network, the input thereto from line 34 being compared with a reference signal developed through resistor 140, potentiometer 142 which is coupled as a rheostat and a Zener diode 144. Diode 144, for example, serves as a 9 volt reference and, operating in conjunction with filter capacitors as at 146 and 148, provides a 9.1 volt reference from a 12 volt power supply input at line 150 which is derived from the low voltage power supply 36. In this regard, looking momentarily to FIG. 5A, this input represented in FIG. 3 by line 38, is illustrated. The function of line 38 is to provide a +16 v. input as at line 152 which is referenced to the high voltage common or rail 56 as represented at line 154. A filtering capacitor may be provided in conjunction with line 154 as shown. Line 152 is directed to the input of a three terminal regulator 156 which may, for example, be of a type LM340AT-12 which serves to regulate the 16 volts input to 12 volts at line 158. An additional filter capacitor is provided extending from line 158 to high voltage common. The regulated output at line 158 is directed to line 150 as well as to line 218 as shown in FIG. 5.

Returning to FIG. 5, the output of operational amplification state 134 at line 160 is coupled to a feedback path including line 162 and resistor 164 which serves to supply a hysteresis function for the operation of amplification stage 134. In this regard, when the input from line 34 to amplification stage 134 equals the reference current from resistor 140, then the output thereof at line 160 assumes a logic high level which is stabilized by the feedback line 162. This output then is directed through an R.C. delay network 166 including resistor 168, capacitor 170 and diode 172. Network 166 serves to delay the availability of the power signal for an interval of about one-fourth second to accommodate for any failure mode wherein power would be lost very shortly after being attained, i.e. in the event of a failure of the closure of relay contacts 122 (FIG. 4). Diode 172 serves to enhance the discharg of capacitor 170.

Stage 135 serves as a buffer having the noted 9.1 volt reference voltage input asserted thereat through resistor 174 and the voltage level developed initially from capacitor 170 asserted therethrough through resistor 176. Thus, at the termination of the delay of network 166, buffer stage 135 provides a high logic signal along line 178 to one input of stage 36 through line 180 and resistor 182. Stage 136 functions as an output driver having a second input thereto through line 184 which is coupled to the noted 9.1 volt reference at line 186 and includes input resistor 188. The corresponding output of stage 136 is presented at line 190 extending through resistor 192 to light emitting diode 194, the opposite side of which is coupled to common. LED 194 is part of an isolative, optical coupler which includes phototransistor 196, the emitter and collector of which respectively are connected to lines 198 and 200 and serve, when the phototransistor is activated, to carry a power available or enablement signal which is described in conjunction with line 40 in FIG. 3. Line 200 will be seen to extend to inverter stage 590 in FIG. 10, while line 198 is coupled to logic ground. The isolative coupling is provided to protect logic circuit components within PWM function 42.

Line 178 also extends through input resistor 202 to one input of stage 137. In similar fashion to stage 136, the opposite input to stage 137 is provided from the reference voltage at lines 186 and 184, the latter including an input resistor 204. Stage 137 serves as an output driver for the winding 206 associated with the contacts 122 (FIG. 4) of the soft charge relay. In this regard, the output of stage 137 at line 208 is coupled through a base resistor to a cascaded transistor combination including NPN transistor 210 and Darlington connected transistor pair 212. The emitter of transistor 210 is coupled along line 214 to the base of transistor pair 212, while the collector is coupled through resistor 216 to line 218 which, in turn, is coupled to +2 v supply as described in conjunction with FIG. 5A at line 158. The emitter of transistor pair 212 is coupled to high voltage common, while the collectors thereof are coupled to line 220. Lines 218 and 220 serve to provide the energization of winding 206. A diode 222 is positioned intermediate lines 218 and 220 to accommodate for inductive currents developed at winding 206. With the arrangement shown, as the voltage at line 34 reaches a predetermined level, for example 680 volts, then the output of stage 137 at line 208 is high which effects a turning on of the cascaded transistors 210 and 212 to draw current through winding 206 and effect a closure of contacts 122 in the by-pass network including line 124 as described at FIG. 4.

Low Voltage Power Supply

The low voltage power supply described in conjunction with FIG. 3 at block 36 exhibits two aspects of performance, a preregulator function and a switching supply function. Looking to FIG. 6, the preregulation function of the low voltage power supply is revealed in enhanced detail. This preregulator aspect serves to determine the ultimate output voltage of this supply inasmuch as the switching function has no inherent regulation. In operation, the high voltage rail 54 of high voltage d.c. bus 26 is tapped as represented by line 44 which incorporates a fuse 230, for example of one-eighth amp capacity, and then extends to line 232 which, in turn, leads to a resistor 234 which serves to drop the voltage from line 232 to a more convenient level. In this regard, the voltage level available from line 44 may be in the 600 to 750 volt range and it is desirable to regulate within a selected lower range. For example, for the instant embodiment, a pregulation or intermediate voltage of about 500 volts is elected. The thus-dropped but unregulated voltage then becomes available at line 238 which is introduced to the drain of a high voltage field effect transistor (FET) 240. With this arrangement, the source electrode of transistor 240 at line 242 carries a preregulated voltage. FET 240 thus serves as a series regulator and may be provided, for example as a type MTN1N95 marketed by Motorola, Inc. An FET as at 240 is used at this position inasmuch as it exhibits excellent current gain characteristics and is fast. By distinction, a bi-polar device used at this position in the circuitry at the requisite voltage ratings involved will have an insufficient current gain. The gate of FET 240 at line 244 is biased from line 232 and resistor 246 which is coupled by line 1248 to line 244. An R.C. network 250 including resistor 252 and capacitor 254 is coupled between line 248 and high voltage common to provide lag compensation for overly rapid voltage changes at the gate line 244. A Zener diode 256 is connected between the gate and source of FET 240 to limit the value of gate to source voltages.

Inasmuch as the gate of FET 240 is biased on from line 248, to achieve regulation the current at line 244 is controllably shunted as a function of the output voltage at line 242. The shunt regulator carrying this out is an FET 258 which may, for example, be a type MTP1N95 marketed by Motorola, Inc. which is coupled having its drain connected to line 244 and its source to high voltage common through line 260.

The shunting control of gate 258 is developed by virtue of the voltage asserted at its gate at line 262. Because of the gate capacitance characteristics at FET 258, where no current is shunted, it is necessary to provide a discharge path to dissipate voltage build-up and this is achieved by providing a resistor 264 which is coupled between line 262 and high voltage common. Resistor 264 also serves as a current-to-voltage converter. It is a characteristic of FET devices as at 240 and 258 that they exhibit gate thresholds which vary somewhat substantially from device to device as well as with respect to temperature. To accommodate for this characteristic, a bi-polar NPN transistor 266 is provided having its collector coupled to line 262 and its emitter connected to a voltage dividing circuit represented at resistor 268 coupled between lines 242 and 270, and variable resistor 272 and resistor 274 coupled within line 276 between line 270 and high voltage common. The base of transistor 266 is coupled via line 278 to a Zener diode 280, the latter being, in turn, coupled to high voltage common. Line 278 additionally is coupled through lines 282 and 284 to resistor 288 which is coupled to high voltage carrying line 232. Thus, a controlled voltage of about 14 volts is derived at line 278 as well as at line 282. With the arrangement shown, where the divider network resistance is appropriately adjusted at varible resistor 272, as the voltage at line 242 exceeds a desired level, transistor 266 is biased on to effect the injection of current into the emitter thereof which via transistor action causes collector current to flow into resistor 264 developing a voltage which turns FET 258 to an on condition. As FET 258 is turned on, current is shunted from the gate of FET 240 via line 244 and FET 240 tends to turn off. FET 240 thus becomes A voltage controlled current device.

The switching or oscillatory components of the low voltage power supply operate as a capacitive load to the instant preregulator system. Accordingly, the earlier described lag form of R.C. network 250 is provided in conjunction with a lead type R.C. network 292 comprised of resistor 294 and capacitor 296. Networks 292 and 250 function in a lead-lag feedback compensation manner to prevent the preregulator from oscillating before the noted capacitive load.

Figure 7:
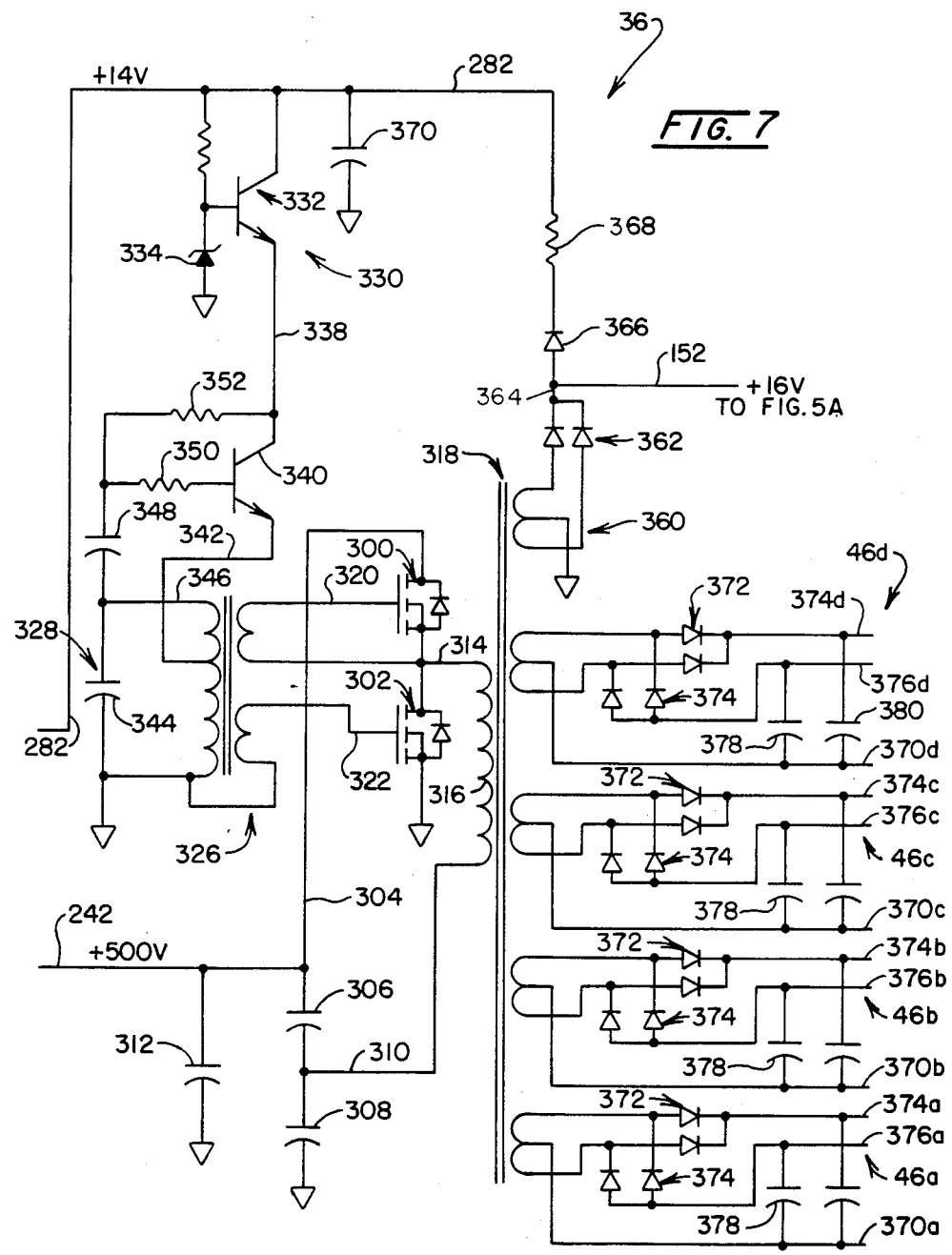
FIG. 7 is a circuit diagram showing another portion of the low voltage power supply components of the invention.

Referring to FIG. 7, the second section of the low voltage power supply 36 is revealed in enhanced detail. This section provides a driver network 48 switching supply which is derived from a half-bridge inverter driven from an oscillator stage and which, in turn, is coupled to the primary side of a high frequency transformer, the discrete step-down secondaries of which are rectified to provide the multiple components of the driver switching supply.

Figure 6:
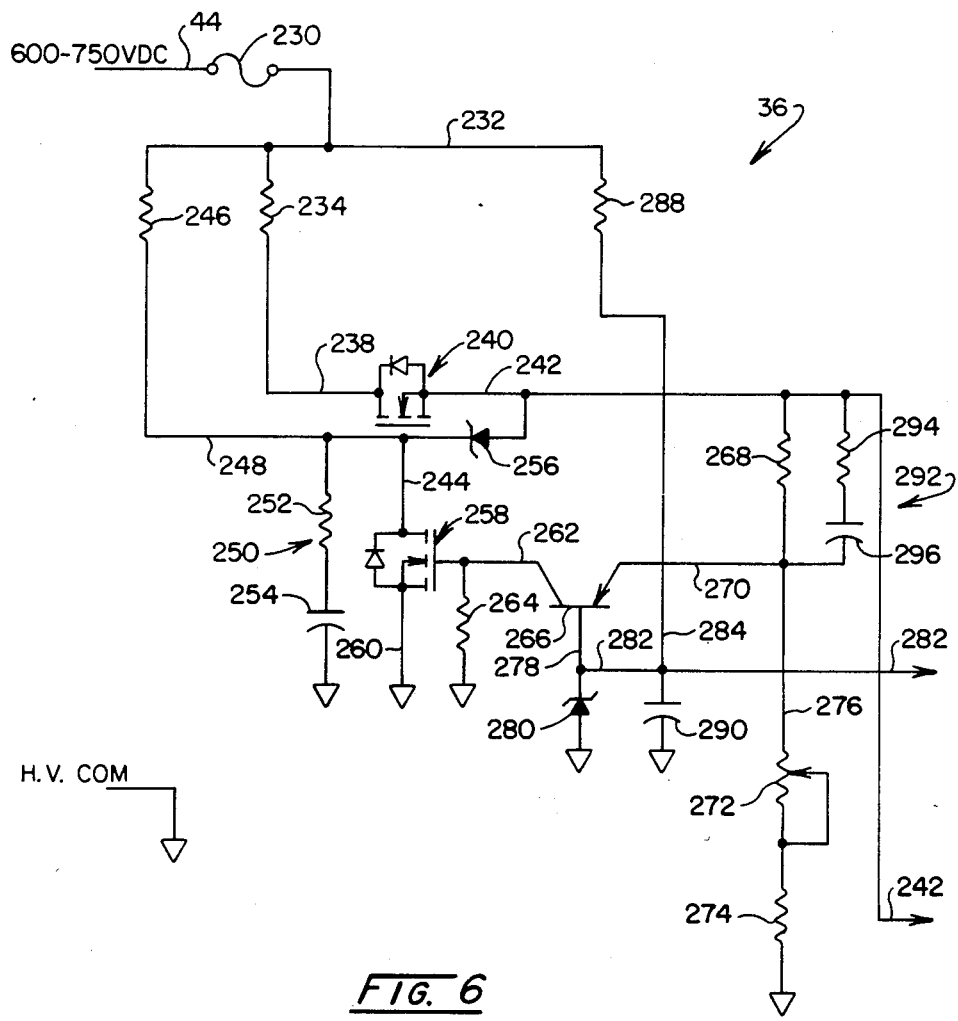
FIG. 6 is a schematic circuit diagram showing components of the low voltage power supply of the instant invention.

The half-bridge inverter is formed of two power MOSFETs 300 and 302 which operate in conjunction with the preregulated d.c. (500 v) output derived at line 242 (FIG. 6). Line 242 again is reproduced in FIG. 7 as leading to line 304 which, in turn, extends to the drain of FET 300 and to voltage capacitors 306 and 308 and thence to high voltage common. Capacitors 306 and 308 are of relatively large capacitive value, for example, one microfarad, 600 v and are of a film variety for withstanding full imposed voltage. The center point between capacitors 306 and 308 at line 310 defines a voltage of about one-half of the 500 v value at line 242. An election to use capacitors for the instant purpose rather than resistors avoids the dissipation difficulties encountered with the latter. It may be recalled that the lead/lag networks 292 and 250 described in FIG. 6 are provided in view of this capacitive load. A smaller capacitor 312 also is coupled between line 242 and high voltage common. This capacitor is of a smaller ceramic type and serves to suppress any tendency for the system to feed high frequency signals to the preregulation components described in connection with FIG. 6.

The provision of squarewave oscillatory drive by FETs 300 and 302 follows from their connection wherein the source of FET 300 is coupled in common to the drain of FET 302 and the common point therebetween at line 314 is coupled to one side of the primary winding 316 of a power supply transformer represented in general at 318. The opposite side of primary winding 316 is coupled via line 310 to the common point intermediate capacitors 306 and 308. In conventional fashion, the remaining connections for the half-bridge inverter include the coupling of the drain of FET 300 to line 304 and, thus, to the preregulated voltage at line 242, while the source of FET 302 is coupled to high voltage common. Thus, the rectilinear wave which can be developed from the half-bridge inverter is one having an amplitude of one-half the supply available at line 242. To minimize the size of power supply transformer 318, it is desirable to develop a relatively high frequency rectalinear wave input at the primary winding 316, for example between 80 and 100 KHz, the particular value of frequency within that range not being critical. To provide this drive, a complementary waveform is developed for assertion at the gates of FETs 300 and 302 respectively through lines 320 and 322. Lines 320 and 322 are coupled to discrete secondary windings of a multiple winding transformer 326. Transformer 326 serves as a tapped inductor for an oscillator network represented generally at 328. Oscillator network 328 is powered from an additional regulator network represened at 330, which, in turn, is coupled in power supply relationship with line 282 which, as disclose in conjunction with FIG. 6, is powered in step down fashion at start-up of the system from line 232 through line 284. Serving to assure that the oscillator network 328 is supplied voltage within a proper range so as to protect the gate electrodes of FETs 300 and 302, for the instant embodiment the regulator network 330 is supplied about 14 volts from line 282 which supply is directed to the collector of an NPN transistor 332. The base of transistor 332 is referenced by Zener diode 334, which is coupled to high voltage common and is biased through a resistor 336 which, is coupled to line 282. Regulator 330 provide s a controlled voltage output at line 338 which is directed to the collector of an NPN transistor 340, the emitter of which is coupled through line 342 to a tap on the primary winding of transformer 326, which which the capacitor 344, forms a tank circuit. The primary output line 346 of transformer 326 is coupled through a capacitor 348 and base resistor 350 to the base of transistor 340 to effect a phase shifted biasing thereof, the consequence of which is the generation of an oscillation providing complementary sinusoidal signals alternately gating on FETs 300 and 302 from lines 320 and 322. It may be noted that the gate capacitances of FETs 300 and 302 participate as part of the tank circuit such participation effecting a non-critical alteration of frequency of oscillation.

As indicated above, the power developed through step-down resistor 288 (FIG. 6) derives sufficient current for start-up but the accompanying current supply is insufficient for subsequent performance of the system. This start-up arrangement holds the dissipation of power to a desirable minimum. A supplementary source of power is required to be asserted at line 282 following start-up and this supplementary input of power is derived from a small secondary winding 360 of power supply transformer 318. Winding 360 is connected such that its center tap is returned to high voltage common and the two legs thereof are coupled through dual diodes 362 which are connected in common to line 364. Line 364 then carries about a 16 volt supply for the instant embodiment which is directed to earlier described line 152 (FIG. 5A). Line 364 additionally is coupled to an isolating diode 366 which, in turn, is coupled to line 282 incorporating resistor 368 and a filtering capacitor 370 connected between line 282 and high voltage common. Diode 366 isolates the output at line 364 during start-up, while resistor 368 serves to bias on Zener diode 280 following start up.

The manually isolated outputs of the low voltage power supply 36 as described in conjunction with FIG. 3 at lines 46a–46d are shown in FIG. 7 as being developed by discrete isolated secondary windings having the same general designation. Inasmuch as all of these isolated outputs are identically structured, the same numeration is utilized in identifying their components with additional alphabetical suffixes being used to identify output lines. For each of the secondary winding outputs 46a–46d, a winding center tap line 370 is utilized to form a common. Two winding ends of each secondary are tied to the anodes of a two diode combination 372, the common cathode connections of which provide a positive supply at line 374 which may, for example, be at about 5.5 volts. The winding ends also are coupled to the cathodes of two discrete diodes 374, the anodes of which are coupled in common to line 376 to form the negative supply, for example at −5.5 v at line 376. Low impedance capacitors 378 and 380 are coupled respectively between the positive supply line 374 and common line 370 and the negative supply line 376 and common. Diodes 372 preferably are high speed diodes, for example, type BYV32-50, while diodes 374 may be high speed diodes provided as type BYV27-50. Isolation of each of the secondary windings of outputs 46a–46d is achieved by spacing these windings about one-eighth inch apart.

The purpose in developing the low voltage power supply from the high voltage power supply itself as opposed to developing this low voltage power supply from, for example, the a.c. input line or the like stems from the desirability of having a supply active whenever high voltage is present in the system. With such assurance of a driver power supply in the presence of high voltage, resort to redundant design and the like is avoided which otherwise would be required with the use of transformed separate inputs. Another advantage stems from the instant system, inasmuch as a tolerance exists for a very wide range or variation in the supply. Even though very high voltages are involved, switching tasks are ameliorated due to the low currents at hand. Also, this type of supply is compact, fairly efficient and of light weight.

DRIVER NETWORK

The driver network has been described in general in conjunction with block 48 in FIG. 3. This network incorporates six identical circuits, D1–D6 which, through the utilization of an isolating, high speed optical coupling, receive logic inputs from the pulse width modulation network 42 and, utilizing the isolated power supplies from low voltage power supply function 36, serve to impose logic controlled base drive "on" currents or on-drive signals to the power transistors Q1–Q6 of inverter switching bridge function 50. These individual driver circuits also provide an "off" voltage bias or off-drive signals so as to minimize the time required for turning off the power transistor stages, and, thus minimize power transistor storage times. Optical coupling with the PWM function is required inasmuch as the drive circuits D1–D6 float with their respective associated power transistor stages Q1–Q6 and, therefore, fluctuate with the high load voltages. Inasmuch as each of the circuits D1–D6 are identical in structure, only one representative circuit is discussed in detail herein in conjunction with FIG. 8. Generally, the circuits are identically connected with the exception that driver circuits D2, D4 and D6 are commonly connected with low voltage power supply output 46a. It may be noted that the corresponding power transistor stages Q2, Q4 and Q6 have a common emitter connection with high voltage common rail 56.

Figure 8:
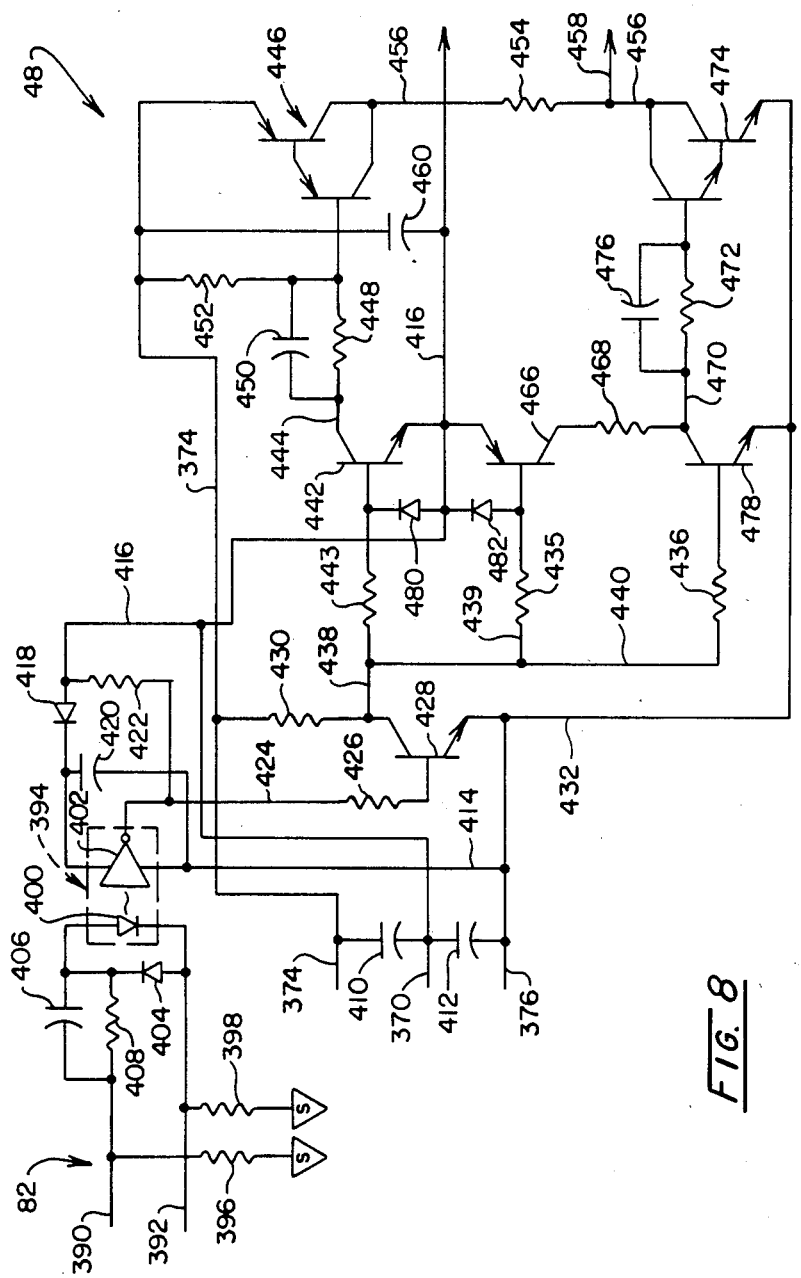
FIG. 8 is a schematic circuit diagram of a driver network utilized with the instant invention.
Figure 10:
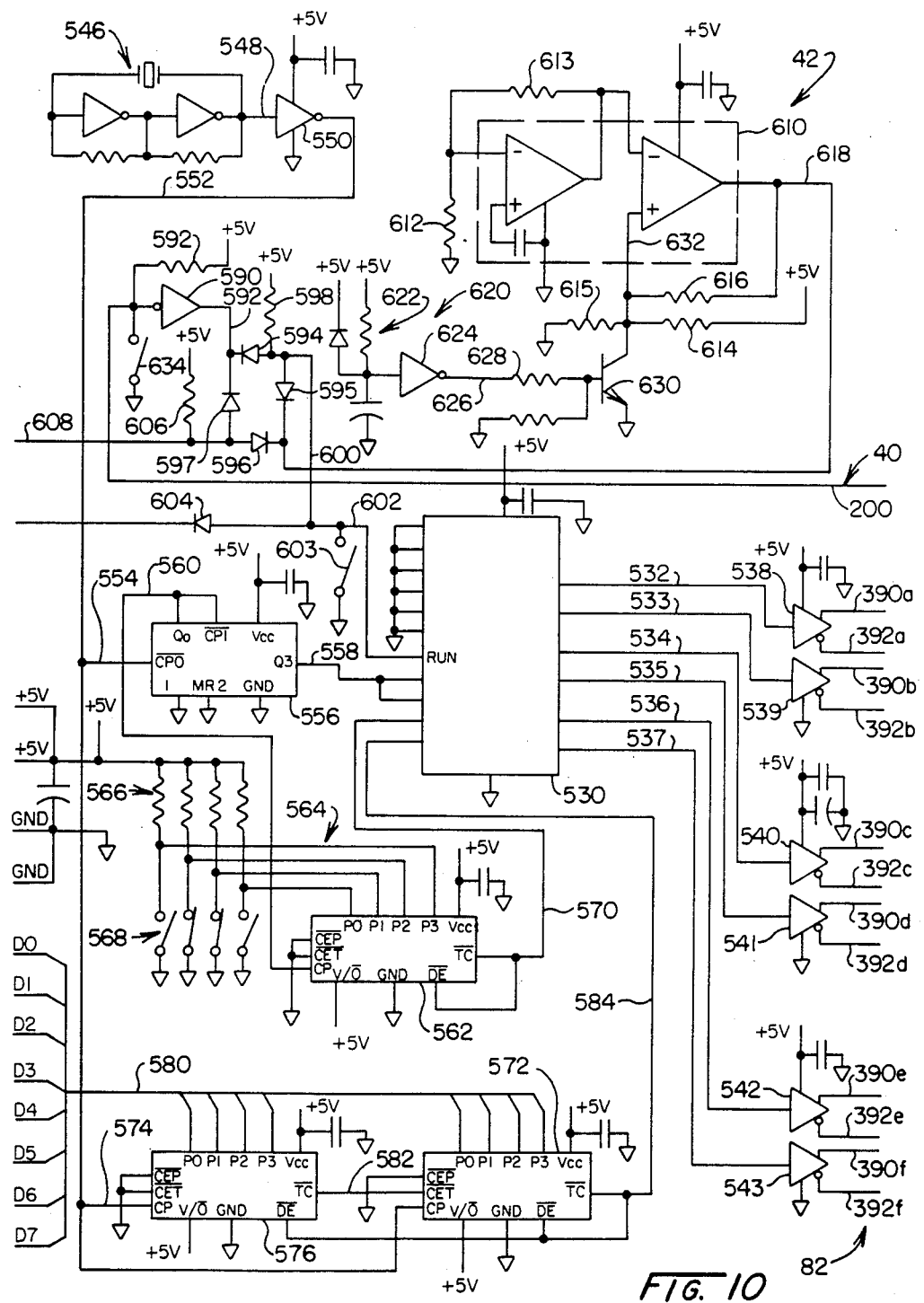
FIG. 10 is a schematic circuit diagram of a control circuit of the invention.

Referring to FIG. 8, input cables represented by line 82 in FIG. 3 and identified specifically in FIG. 10 at 390 and 392 with appropriate alphabetical suffixes a-f are generally represented (without the latter suffix) as being introduced to a high speed optical coupler 394. Cables 390 and 392 are of a shielded variety with appropriate grounding lines shown incorporating respective resistors 396 and 398. These resistors are termination resistors matched to wiring impedance and serve to avoid energy ring-back phenomena and the like. Coupling 394 includes a light emitting diode 400 packaged in juxtaposition to a photoresponsive detector 402. The signals supplied via cables 390 and 392 from PWM function 42 provide a relatively high current differential drive, one output for example having a +5 v level and the other being retained at ground. To turn off LED 400, the signals at cables 390 and 392 are reversed to opposite states. This tends to energize LED 400 between on and off states very quickly. To enhance the switching speed of the coupling, an inversely connected diode 404 along with capacitor 406 and resistor 408 are coupled with the input to coupler 394. Resistor 408 is a current limiter which is surmounted by capacitor 406 which functions to enhance high current flows during turn-on and turn-off of LED 400. The capacitor also provides accommodation or parasitic capacitance at LED 400. Diode 404 serves to limit reverse current through LED 400.

The power supply input from low voltage power supply 36 to the driver circuit is provided from a selected one of the outputs described in FIG. 7 at 370, 374 and 376 along with a driver circuit designating alphabetical suffix. The latter suffixes are deleted in the instant figure in view of the universal nature of the circuit under description.

In FIG. 8, it may be observed that filtering capacitors 410 and 412 are coupled intermediate common line 370 and respective supply lines 374 and 376. These capacitors are utilized to absorb high frequency transients. Negative supply line 376 is coupled through line 414 to the negative supply input to detector 402, while common supply line 370 is connected to the opposite side of detector 402 through line 416 which incorporates a voltage dropping diode 418. A capacitor 420 is connected from line 416 to the negative supply line 414 to provide noise immunity from the supply, and a load resistor 422 is coupled between line 416 and the output of detector 402 at line 424.

Detector 402 operates such that, depending upon the energization of LED 400, it will assume a level close to the negative supply from line 376 or the biased level determined by resistor 422 which will be about 5.5 volts above negative supply. Thus, when LED 400 is energized, the output at line 424 may be considered as a logic low.

Output line 424 is coupled through resistor 426 to the base of an NPN transistor 428, the collector of which is coupled through resistor 430 to positive supply line 374 and the emitter of which is coupled through line 432 to negative supply line 376. Thus, when LED 400 is not energized, transistor 428 is turned on. This "on" condition can be seen to correspond to a switching bridge 50 condition wherein the corresponding power transistor is turned off, thus providing a fail safe mode of performance. Inasmuch a transistor 428 is coupled to the positive supply at line 374 through resistor 430, a logical inversion and level translation occurs such that when LED 400 is on, the transistor 428 is off and thus current is supplied through resistor 430 to three resistors 434, 435 and 436 which, respectively, are coupled within lines 438, 439 and 440. Line 438 carrying resistor 434 is coupled to the base of an NPN transistor 442, the emitter of which is connected to line 416 which is coupled to low voltage power supply common line 370. The collector of transistor 442 is coupled via line 444 to the base of PNP Darlington connected driver output transistor pair 446. The latter transistor pair is drawn into an on status very rapidly by virtue of the form of base drive made available by the by-passing of base resistor 448 with capacitor 450. Capacitor 450 is charged through resistor 452 which, in turn, is coupled to positive voltage supply line 374. The emitter of driver transistor pair 446 is coupled to positive supply line 374, while the collector thereof is coupled through current limiting resistor 454 and line 546 to output line 458 leading to the base of an appropriate switching bridge 50 transistor stage and providing base drive current to turn such transistor stage on. Resistor 452 carries out a bleed function to accommodate leakage currents on the PNP driver output transistor 446 and further serves in the charging of capacitor 450. A capacitor 460 is connected intermediate supply line 374 and line 416 to accommodate for any supply transient which might be generated by transistor pair 446. Line 416 is coupled to the appropriate emitter function of the transistor stages within switching bridge 50. Transistor pair 446 my be provided, for example as a type D43D1, while transistors 442 and 428 may be provided as type 2N3904.

Now considering a condition wherein LED 400 is off, as above described, this will cause the turning on of NPN transistor 428. As transistor 428 turns on, PNP transistor 466 is drawn on through resistor 435. The emitter of transistor 466 is coupled to common line 416, while the collector thereof is coupled through resistor 468, line 470 and base resistor 472 to the base of Darlington connected PNP driver transistor pair 474. The collector of transistor pair 474 is coupled through line 456 to the switching bridge connecting line 458, while the emitter of the transistor is coupled to line 432 extending to negative supply line 376. As a consequence, a negative bias is imposed through line 458 to the coupled switching bridge power transistor to positively turn it off and hold it in such off condition. An assertion of this negative bias also improves the energy handling capability of the power transistor stages. To accelerate the actuation of transistor pair 474, a capacitor 476 is coupled to by-pass resistor 472.

For a next succeeding pulse defining cycle, LED 400 is energized to effect the turning on of transistor pair 446. However, to achieve adequate switching performance, it is necessary to effectively turn of transistor 474 and remove the bias from the power transistor. This is carried out by the turning on of NPN transistor 478 to effect the rapid removal of base drive from transistor 474 by the discharge of capacitor 476 across transistor 478. The base drive to transistor 478 is effected through resistor 436 in line 440 which is derived upon the turning off of transistor 428. Diodes as at 480 and 482 are coupled, respectively, between line 483, line 439 and line 416. These diodes serve to prevent avalanching of the base-emitter junction of transistors 442 and 466.

With the arrangement of FIG. 8, a characteristic operation is achieved when base drives are developed which are sufficient to turn on the high gain, high power transistor output devices of switching bridge 50. On the other hand, at turn-off, the base of these power transistors are switched to a negative voltage potential and can supply a relatively large amount of current for a matter of a few microseconds until all charge is swept from the base of the power transistor stages of switching bridge 50. In effect, the storage time characteristic of the transistor stages within switching bridge 50 are significantly reduced. It may be noted further, that all of the power transistors operate with identical and discrete driver circuit configurations.

INVERTER SWITCHING BRIDGE

Figure 9:
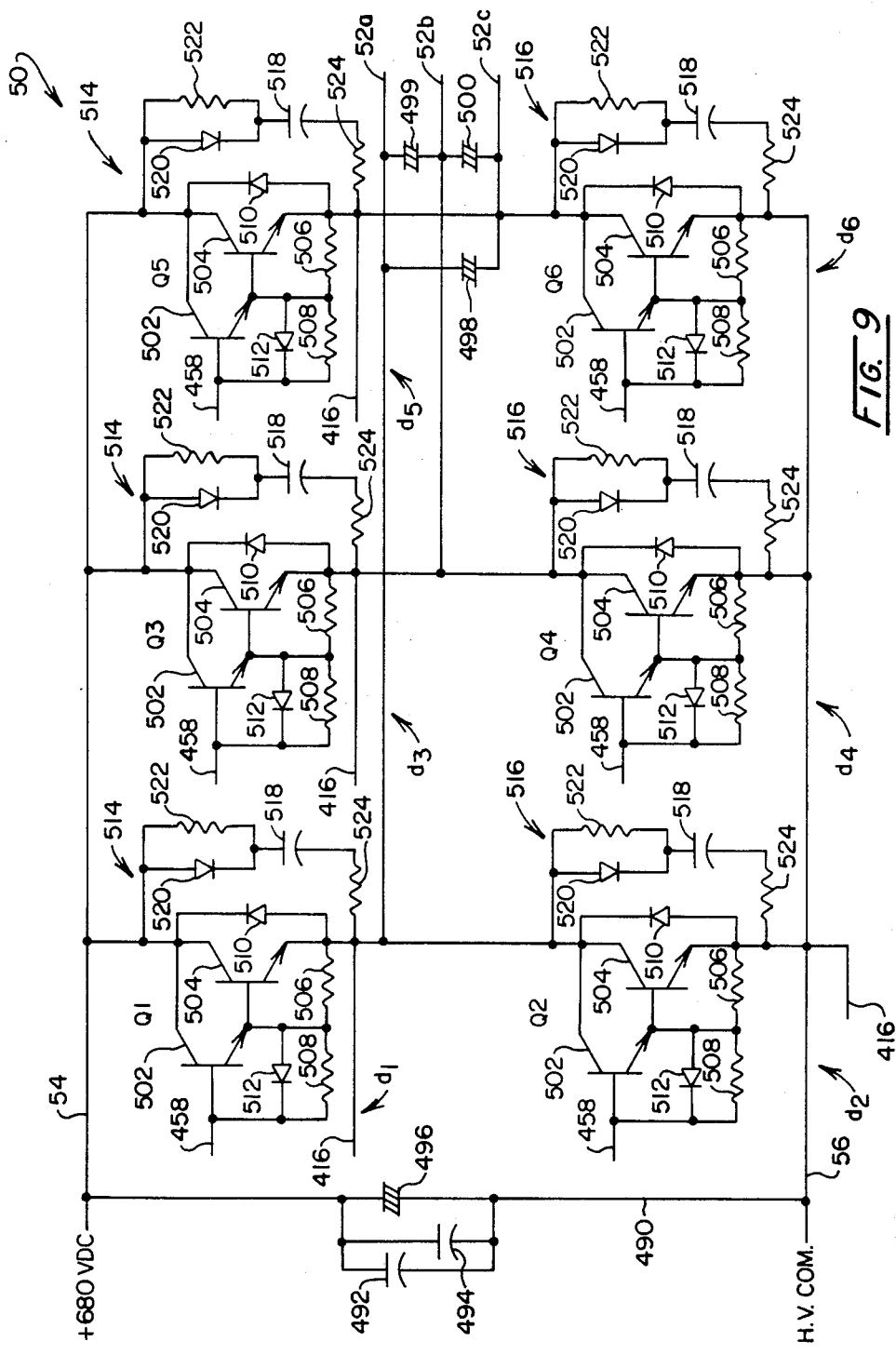
FIG. 9 is a schematic circuit diagram of an inverter switching bridge utilized with the instant invention.

As indicated above, the inverter switching bridge represented in FIG. 3 at block 50 is comprised of three, phase-designated transistor pair stages Q1–Q2, Q3–Q4 and Q5–Q6. These transistor pairs as well as high voltage d.c. rails 54 and 56 and the three-phase output lines 52a–52c again are reproduced in FIG. 9 along with the common numeration developed in conjunction with FIGS. 3 and 8 for the driver network 48 discrete driver circuits D1–D6. In general, the three-phase outputs at lines 52a–52c are modulated rectangular type waveforms that switch between the high voltage common rail 56 potential and the potential at the positive high voltage d.c. rail 54, a value of about 680 volts. A key to the operation of the switching bridge 50 is the utilization of the bridge with an inductive load represented by an a.c. motor type with a current based operation.

The individual stages Q1–Q6 of the switching bridge 50 are identically structured with the exception of the common emitter coupling for stages Q2, Q4 and Q6 at rail 56. In view of this identical structuring, common numeration is utilized in their description herein. Further, such description will be directed to stages Q1 and Q2, it being understood that the remaining coupled stages are configured and operate identically in conjunction with outputs 52b and 52c.

At the input to switching bridge 50, a line 490 is provided which carries a capacitor 492 along with a parallel connected capacitor 494. These capacitors serve a protective high frequency filtering function. Additionally, a metal oxide varistor 496 is incorporated in line 494 for circuit protection purposes. In similar manner on the output of the switching bridge 50, three metal oxide varistors 498–500 are coupled in delta configuration with output lines 52a–52c to protect the circuit against motor fault transients and the like. In this regard, certain motors incorporate internal line break provisions which could cause severe transient damage in the absence of such protection.

The transistor stages Q1–Q6 are comprised of 50 ampere NPN silicon power Darlington transistors, for example of the type MJ10051 marketed by Motorola, Inc., Phoenix, Ariz. Each of the transistor stages includes an input NPN transistor device 502 and a corresponding output NPN device 504. Device 504 includes an internal base bleed resistor 506, while device 502 contains a similar resistor 508. Additionally, each output stage includes a free-wheeling diode 510, the anode of which is connected to the emitter of device 504 the cathode of which is connected to the collector thereof. Inasmuch as inductive loads exhibit a free-wheeling effect, the reverse currents occasioned thereby may flow through these diodes 510. For the configuration at hand, it will be seen that the complementary stage free-wheeling diode carries current at a point of stage turn-off. Each stage also includes a hybrid diode 512 coupled from the base of output device 504 to the base of device 504 to the base of device 502. The purpose of diode 512 is to provide a path drawing charge from the base of the output device during the period of its turn-off to remove storage charge which would otherwise slow down the interval of such turn-off, i.e. to remove the storage charge. Recall that a negative potential is applied to line 458 during turn-off procedures.

As indicated earlier herein, the six switching stages Q1-Q6 are connected in a three-phase form of H bridge. With this arrangement, the collector of one device is connected to the positive high voltage supply rail 54, while its emitter is coupled to a load line as at 52a-52c. The complementary device, one of stages Q2, Q4 and Q6 is arranged such that its emitter is tied to the high voltage common rail 56 and its collector to an appropriate load line 52a-52c. The upper stages Q1, Q3 and Q5 are driven from respective driver circuits D1, D3 and D5 which have no common power supply connection. The three lower stages Q2, Q4 and Q6 which have common emitter connections at rail 56 are supplied power from respective driver circuits D2, D4 and D6 which share a power supply. This arrangement is permitted by the common emitter connection.

For the inductive loads at hand, high voltage and high current must be sustained simultaneously during turn-off of the switching stages with the base to emitter junctions thereof reverse-biased. Under these conditions, the collector voltage must be held to a safe level at or below a specific value of collector current. To accommodate for this requirement, the inverter bridge 50 provides a form of snubber network shown generally at 514 for upper stages Q1, Q3 and Q5 and an identical snubber network shown generally at 516 for lower stages Q2, Q4 and Q6. All of the networks incorporate a capacitor 518, a fast recovery diode 520, a discharge resistor 522 and a current limiting resistor 524.

Looking to network 514, as stage Q1 is turned off and reverse bias applied to the base thereof through line 458, current will be diverted through fast recovery diode 520 to effect a charging of capacitors 518 and evoke a ramp form of voltage build-up. As these capacitors 518 reach the rail 54 potential (680v.dc) diode 520 will be reverse biased to terminate current flow at stage Q1 and thus provide a clamping function. The PWM logic 42 generally will provide an interval between the turning off of stage Q1 and turning on of stage Q2. However, because of the nature of the inductive load at hand, current must continue to flow and this current flow occurs through the free-wheeling diode 510 of switching stage Q2. By design, the stages Q1 and Q2 are alternately turned on and off, however, for most of a cycle, the lower stage Q2 does not actually switch on because of the direction of current flow, current not reversing through the inductor such that even though the drive signal to turn stage Q2 on is present, current actually flows through the free-wheeling diode 510 thereof. As the pulse widths defined at the upper device Q1 reduce to a point where the zero crossing of the current sinusoid is reached, then the lower stage Q2 commences to carry current. During this period when both devices Q1 and Q2 are carrying current in turn, and the upper stage turns off, very large current surges would be seen by the output stage 504 of stage Q2 such that it would exceed device ratings. Resistor 524 limits this current surge to acceptable values. At such time as upper switching stage Q1 is turned on, the capacitor 518 is essentially, fully discharged by discharge resistor 522. The modified snubber networks 516 of switching stages Q2, Q4 and Q6 operate in essentially the same fashion as those at 514 in connection with the upper stages Q1, Q3 and Q5. With the modified snubber arrangement as shown, high efficiencies have been experienced.

PWM Logic

As described in conjunction with FIG. 3, the development of a pulse width modulated output of the system 20 is achieved by controls asserted to the driver network 48 from a digitally oriented logic network 42. This network 42, in turn, is controlled in entirely digital fashion from a microprocessor as at 68 or suitable computer input. Referring to FIG. 10, an enhanced representation of the pulse width modulation function is revealed. Generally, the development of a variable voltage, variable frequency PWM induction motor drive is carried out, in effect, by an approach wherein an Isosceles triangle carrier wave is compared with a desired sinewave signal. The cross-over points of this combination determine the turn off points for the switching bridge. Except at low frequency ranges, this carrier is synchronized with the sinewave signal and an even integral ratio is maintained to improve the harmonic content. The fundamental output voltage with this approach can be varied by variation of the modulation index. This latter term is defined as the ratio of amplitude of sinewave to the triangular carrier wave. If this modulation index becomes less than unity, only carrier frequency harmonics with fundamental frequency related side bands will appear. Typical carrier frequency lies between 1.5 and 2.5 kHz.

The instant system utilizes an LSI circuit marketed by Signetics Corp. and identified as a type HEF4752V and is shown in the figure at 530. Circuit 530 is fabricated using locally oxidized CMOS technology (LOCMOS). The integrated circuit provides three complementary pairs of output drive waveforms which, when applied to a 3-phase bridge inverter through a driver stage, will produce a symmetrical, 3-phase (120°) output. For the instant system, the six outputs of circuit 530 are represented at lines 532-537, each being directed to a respective differential driver 538-543. The latter drivers supply the desired higher level currents to energize the LEDs of driver circuits D1-D6 as described in conjunction with FIG. 8. Drivers 538-543 may, for example, be provided as type 75158 and derive a differential drive wherein one output has, for example, a $\equiv$v level while the other is at ground. The outputs reverse in the opposite state and as described in conjunction with FIG. 8, the dual outputs for each of these drivers are identified at 390 and 392 generally. However, for the six drivers in FIG. 10, the outputs are represented at 390a-390f and at 392a-392f in representation of the outputs for all six discrete driver function circuits D1-D6.

Circuit 530 has four clock type input ports which respond to a frequency signal to effect control. Additionally, one input is provided for enablement or for initiating and maintaining a run condition. The frequency signal generation for controls asserted to circuit 530 finds its genesis in a stable, crystal driven oscillator 546 having an 8 MHz output at line 548 which is directed through buffer 550. The 8 Mhz output of buffer 550 is directed along line 552 and line 554 to the input of a 4-bit binary counter 556. Counter 556 is coupled to provide an output at its Q3 terminal and line 558 which is directed to two control terminals of circuit 530. One such terminal determines the output delay between two switches of a phase, while the other terminal determines the ultimate modulation or switching frequency at which the PWM waveform changes state. As noted above, it is necessary that the modulation frequency be an integer multiple of the output frequency synthesized to avoid generation of sub-harmonics. A 500 kHz input at line 558 will provide a 1.8 kHz modulation or switching frequency. Circuit 530 will function to maintain the 1.8 kHz by shifting the integer ratio. This is known in the industry as "gear shifting" and serves to enhance motor efficiency. The 500 kHz as directed to the upper control terminal serves to develop a 16 microsecond delay between two phase switches. Counter 556, for example, be a type 74LS93. The counter is tapped at its $\overline{CP1}$ and $Q_0$ terminals by a line 560 which is directed to the CP input of a 4-bit presettable counter 562. Provided, for example, as a type 74LS169, counter 562 is set by appropriate signals applied to its P0-P3 setting inputs through line grouping 564. Line grouping 564, in turn, is coupled to a corresponding grouping of pull-up resistors 566 coupled to +5 v as well as a grouping of four DIP switches 568 coupled between pull-up resistors 566 and ground. The output of counter 562 at line 570 is directed to the control input port of circuit 530. The elected frequency so directed to this input port determines the motor volt per Hertz value of the output or a control of modulation depth, i.e. the magnetization levels within the motor. The maintenance of constant torque with respect to varying load demands can be achieved through adjustment at this position. It will be apparent that the switching array 568 may be replaced by an appropriate input from the microprocessor control 68 (FIG. 3). Further, the counters may consist of lesser or greater numbers of stages and may be operated from an oscillator of more or less frequency.

Line 552 additionally is directed to the CP input of another four-bit presettable counter 572 and through line 574 to the corresponding input of an identical counter 576. The programmable inputs, P0-P3 of each counter 576 are coupled with the eight leads of a data bus having inputs D0-D7 extending from the microprocessor control 68 of the system. Counters 576 and 572 are coupled, respectively, between their $\overline{TC}$ and $\overline{CET}$ ports by line 582 to provide a cascaded form of operation and thus providing a selected frequency output at line 584 which is directed to another control port of circuit 530. The latter port provides a selection of motor drive frequency and, in accordance with the instant invention, this motor drive frequency may be elected by the microprossor function 68 by assertion of an appropriate binary signal at data bus 580. With such an arrangement, frequency rates for motor drive speed can be selected by the assertion of a binary number and such speeds can be varied such that the inductive motor 58 is never driven below minimum speeds established for the compressor function 62. However, the motor may be "ramped up" at start-up to gradually achieve requisite speeds. This is an advantage over conventional approaches wherein start-up is forced at a first minimum speed value.

It may be recalled that a high voltage sensor function 32 develops an optically coupled output signal 40 identified in FIG. 5 at lines 198 and 200 upon the occasion of the voltage level at bus 26 reaching requisite values. Line 200 is shown in FIG. 10 as extending to carry this power available signal to the input of a buffer stage 590. This input normally is maintained at +5 v through pull-up resistor 592. Accordingly, with the assertion of a low at line 200, the output of buffer 590 at line 592 becomes high. Line 592 is directed to a diode logic arrangement including diodes 594-597. In this regard, with a logic high value at line 592, diodes 594 and 597 are back-biased and a +5 v logic high value is asserted through resistor 598 to line 600. Line 600, in turn, is coupled to line 602 which is directed to the "L" terminal of circuit 530. Terminal (Run) is the enabling or run input which permits circuit 530 to operate. A switch 603 is provided to draw the logic level at line 602 to a low to permit testing and the like. Line 602 also extends through a diode 604 to connection with the microprocessor function 68 (FIG. 3). With such an arrangement, by the assertion by the microprocessor of a low value at line 602, the enablement at the run terminal of circuit 530 may be removed. Thus, the microprocessor function may control the entire system. Inasmuch as the circuit 530 requires a particular voltage level, for example about 4.5 v to operate properly, it further is necessary to monitor the power supply to the PWM network 42 and to provide logic to the microprocessor functions of the presence of that adequate power supply. For normal operation, the +5 v power supply is asserted through resistor 606 and line 608 to provide a logic power signal for microprocessor input.

The presence or absence of an adequate logic power supply is determined by an operational amplifier and voltage reference device represented generally at 610. Device 610 may, for example, be a type LM10 marketed by National SemiConductor Corp. The reference levels detected by device 610 are determined by paired resistors 612 and 613 as well as paired resistors 614 and 615. A hysteresis performance to avoid oscillatory operation for devices 610 is provided by feedback resistor 616. With the arrangement shown, should the logic power supply fall below, for example about 4.7 v, then the output of device 610 at line 618 will be a logic low which will assert the same logic low at lines 600 and 608 by virtue of the interconnection of diodes 594-597. A low at line 600 will induce a corresponding low at line 602 and inhibit any enablement at the run terminal of circuit 530.

Because microprocessor functions as at 68 must be given an opportunity for initialization at system start-up, a small delay, for example on the order of one-half millisecond is provided by a network 620 which includes an R.C. network and associated diode 622 coupled to the input of inverter 624. Network 622 serves to generate a high logic level pulse at output line 626 at start-up which is directed through base resistor 628 of NPN transistor 630. As a consequence, transistor 630 conducts to draw line 632 to a low and cause a corresponding low output at line 618 for the noted short initialization interval.

A second test switch arrangement is provided at 634 at the input of inverter 590.

Since certain changes may be made in the above-described system and apparatus without departing from the scope of the invention herein involved, it is intended that all matter contained in the description thereof or shown in the accompanying drawings shall be interpreted as illustrative and not in a limiting sense.

I claim:

1. A controller for providing pulse width modulated polyphase drive to an a.c. motor comprising:

high voltage rectifier means connectable with an a.c. source for providing a d.c. power output;

low voltage power supply means for providing a d.c. supply output, including:

step down impedance means coupled with said d.c. power supply output for deriving a d.c. output of selectively reduced voltage level, gate controlled series regulator means having an input for receiving said reduced voltage d.c. output and a first gate responsive to a bias signal asserted thereto for deriving a pre-regulated output, gate input means coupled with said series regulator for providing said bias signal at said first gate, shunt regulator means having an input coupled with said gate input means and having a second gate controllable to selectively effect the shunting of said biasing signal from said first gate, reference means for providing a reference output of predetermined voltage level, and gate control means coupled with said second gate, responsive to said reference output and said pre-regulated output for controlling said gate to effect regulation at said gate controlled series regulator means;

first oscillator means coupled with said pre-regulated output for deriving a time varying output;

first transformer means having a primary winding responsive to said time varying output and having first mutually isolated secondary windings for providing discrete, phase designated time varying air supply outputs and of stepped down voltage level;

first discrete, mutually isolated low voltage rectifier means coupled with each phase designated time varying supply outputs for deriving discrete, phase designated positive and negative d.c. supply outputs;

switching bridge means coupled with said d.c. power output, including discrete, phase designated, paired transistor switching stages, each said stage having dual inputs responsive to selectively applied on-drive and off-drive signals to provide a polyphase motor drive at the outputs thereof;

control circuit means for providing discrete, phase designated pulse width modulation control outputs; and driver means having discrete driver networks, each having dual outputs coupled with said dual inputs of a corresponding one of said transistor switching stages, each said driver network having dual power supply inputs coupled with a corresponding one of said discrete, phase designated positive and negative d.c. supply outputs and responsive to a corresponding said discrete, phase designated pulse width modulation control output to derive said on-drive and off-drive signals for application to said transistor switching stage inputs.

2. The controller of claim 1 in which:

said first transformer means includes a second, isolated secondary winding for providing a second supply output;

and including second isolated low voltage recifier means coupled with said second secondary winding for providing a second d.c. supply output;

means for providing power to said reference means from said second d.c. supply output; and means for providing power to said reference means and said gate control means from said d.c. power output when said power is not available from said second d.c. supply output.

3. The controller of claim 2 in which said first oscillator means comprises:

a halfwave bridge inverter coupled with said first transformer means primary winding, having first and second gate control inputs actuable for deriving said time varying output; and second oscillator means coupled in power supply relationship with said second isolated low voltage rectifier means and having first and second outputs coupled with said first and second gate control inputs for effecting the said actuation thereof.

4. The controller of claim 1 in which:

said gate controlled series regulator means and said shunt regulator means are field effect transistors; and said gate control means is a bipolar transistor responsive to said reference output for effecting linear control over said second gate.

5. The controller of claim 6 in which said gate input means includes means for asserting said bias signal at said first gate from said d.c. output.

6. The controller of claim 1 including:

filter capacitor means coupled with said high voltage rectifier means for filtering said d.c. power output;

start-up impedance means coupled intermediate said filter capacitor means and said rectifier means for selectively dissipating current applied thereto from said rectifier means;

by-pass network means actuable to shunt start-up impedance means;

voltage sensing means including comparison network means responsive to the voltage level of said filtered d.c. power output and to the level of a reference voltage for deriving a power signal in the presence of a substantial equality of said levels; and actuator means responsive to said power signal for actuating said by-pass network means.

7. The controller of claim 8 in which:

said control circuit means is responsive to an enable signal to provide said control outputs; and including enabling network means responsive to said voltage sensing means power signal for generating said enable signal.

8. The controller of claim 9 in which said enabling network means includes an optical coupler having an input responsive to said voltage sensing means power signal and an isolated detector circuit for generating said enablement signal in isolation from said power signal.

9. The controller of claim 7 in which said voltage sensing means includes delay network means responsive to the initial development of said equality to delay the derivation of said power signal for a predetermined interval.

10. The controller of claim 6 in which said voltage sensing means includes delay network means responsive to the initial development of said equality to delay the derivation of said power signal for a predetermined interval.

11. The controller of claim 1 in which said control circuit means comprises:

a pulse width modulation integrated circuit having discrete outputs coupled with the inputs of selected said driver networks and responsive to a signal at first frequency applied to a first input thereof to generate corresponding said pulse width modulated control outputs at said discrete outputs;

oscillator means for generating predetermined frequency signals; and programmable counter means having a first input coupled for response to said predetermined frequency signals, an output coupled with said integrated circuit first input for applying a said first frequency signal thereto and a multi-position programming input responsive to an applied multi-bit logic signal for effecting the selection of said first frequency.

12. The controller of claim 11 in which:

said controller includes voltage sensing means responsive to the voltage level of said d.c. power output and a reference level for deriving a power signal in the presence of a substantial equality of said levels; and said control circuit means is responsive to said power signal to apply said enable signal to said pulse width modulation integrated circuit second input.

13. A pulse width modulated polyphase inverter for providing drive to an inductive load from an a.c. source comprising:

high voltage rectifier means connectable with said a.c. source for providing a rectified output;

filter capacitor means connected across said rectified output for providing a filtered d.c. output;

start-up impedance means coupled intermediate said filter capacitor means and said rectifier means for selectively dissipating currents applied thereto from said rectifier means;

by-pass network means actuable to shunt said start-up impedance means;

voltage sensing means including comparison network means responsive to the voltage level of said filtered d.c. output and to the level of a reference voltage for driving a power signal in the presence of a substantial equality of said levels;

actuator means responsive to said power signal for actuating said by-pass network means;

low voltage power supply means responsive to said filtered d.c. output for deriving regulated discrete, phase designated positive and negative d.c. supply outputs;

switching bridge means coupled with said filtered d.c. output, including discrete, phase designated paired transistor switching stages, each said stage having dual inputs responsive to selectively applied on-drive and off-drive signals to provide a polyphase said drive at the outputs thereof;

driver means including discrete driver networks, each having dual outputs coupled with the said dual inputs of a corresponding one of said transistor switching stages, each said driver network having dual power supply inputs coupled with a corresponding one of said discrete, phase designated positive and negative d.c. supply outputs and responsive to a corresponding discrete, phase designated, pulse width modulation control output to derive said on-drive and off-drive signals for application to said transistor switching stage inputs; and control circuit means, including:

a pulse width modulation integrated circuit having discrete outputs coupled with the inputs of selected said driver networks and responsive to a signal at first frequency applied to a first input thereof to generate corresponding said phase designated pulse width modulated control outputs at said discrete outputs and responsive to the presence of an enable signal at a second input thereof to carry out said signal generation, oscillator means for generating predetermined frequency signals, and programmable counter means having a first input coupled for response to said predetermined frequency signals, an output coupled with said integrated circuit first input for applying a said first frequency signal thereto and a multi-position programming input responsive to an applied multi-bit logic signal for effecting the selection of said first frequency.

14. The inverter of claim 13 including enabling network means responsive to said voltage sensing means power signal for generating said enable signal.

15. The inverter of claim 14 in which said enabling network means includes an optical coupler having an input responsive to said voltage sensing means power signal and an isolated detector circuit for generating said enable signal in isolation from said power signal.

16. The inverter of claim 13 in which said voltage sensing means includes delay network means responsive to the initial deveopment of said equality to delay the derivation of said power signal for a predetermined interval.

17. The inverter of claim 14 in which said voltage sensing means includes delay network means responsive to the initial development of said equality to delay the derivation of said power signal for a predetermined interval.

18. A controller for providing pulse width modulated drive to an inductive load comprising:

high voltage rectifier means connectable with an a.c. source for providing a d.c. power output of first and second polarity;

low voltage power supply means including:

step down impedance means coupled with said d.c. power output for deriving a d.c. output of selectively reduced voltage level, gate controlled series regulator means having an input for receiving said reduced voltage d.c. output and a first gate responsive to a bias signal asserted thereto for deriving a pre-regulated output, gate input means coupled with said series regulator means for providing said bias signal at said first gate, shunt regulator means having an input coupled with said gate input means and having a second gate controllable to selectively effect the shunting of said biasing signal from said first gate, reference means for providing a reference output of predetermined voltage level, gate control means coupled with said second gate, responsive to said reference output and said pre-regulated output for controlling said second gate to effect regulation of said gate controlled series regulator means, first oscillator means coupled with said pre-regulated output for deriving a time varying output, first transformer means having a primary winding responsive to said time varying output and having mutually isolated secondary windings for providing discrete, phase designated time varying supply outputs, and discrete, mutually isolated low voltage rectifier means coupled with each said mutually isolated secondary winding for deriving phase designated supply outputs of first and second polarity, switching bridge means coupled with said d.c. power output, including discrete, phase designated, paired transistor switching stages, a first said transistor switching stage of a said pair having emitter and collector terminals coupled, respectively, to an output to said load and to said power output of first polarity and having a base responsive to an on-drive signal to effect conduction across said terminals, a second said transistor switching stage of a said pair having emitter and collector terminals coupled, respectively, to said power output of second polarity and said output to said load and having a base responsive to an on-drive signal to effect conduction across said terminals, each said switching transistor stage having a free-wheeling diode and a snubber network including a capacitor, a fast recovery diode coupled in parallel circuit relationship with a discharge resistor connected between said collector terminal and said capacitor, and current limiting impedance means coupled intermediate said capacitor and said emitter terminal;

control circuit means for providing discrete, phase designated pulse width modulation control outputs; and driver means having discrete driver networks, each corresponding to a unique said transistor switching stage, each said driver network having an on-drive output switching stage actuable from an off to an on state to assert a said on-drive signal and an off-drive output switching stage actuable from an off to an on state to assert an off-drive signal, each said output stage being coupled with said base of said corresponding transistor switching stage, each said driver network being coupled to said low voltage power supply output of first and second polarity and having control switching means responsive to said control circuit means control outputs for selectively actuating said on-drive output stage to a said on state while maintaining said off-drive in a said off state and for selectively actuating said off-drive output stage to a said on state when said on-drive output stage is in a said off state.

19. The controller of claim 18 in which said driver means includes an optical coupler connected for response to said control outputs in isolation from said control circuit means.

20. The controller of claim 18 including:
filter capacitor means coupled with said high voltage rectifier means for filtering said d.c. power output of first and second polarity;
start-up impedance means coupled intermediate said filter capacitor means and said rectifier means for selectively dissipating currents applied thereto from said rectifier means;
by-pass network means actuable to shunt said start-up impedance means;
voltage sensing means including comparison network means responsive to the voltage level of said filtered d.c. output and to the level of a reference voltage for deriving a power signal in the presence of a substantial equality of said levels; and
actuator means responsive to said power signal for actuating said by-pass network means.

21. The controller of claim 20 in which:
said control circuit means is responsive to an enable signal to provide said control outputs; and
including enabling network means responsive to said voltage sensing means power signal for generating said enable signal.

22. A control system for providing pulse width modulated drive to an a.c. motor, comprising:
high voltage rectifier means connectable with an a.c. source for providing a d.c. power output;
low voltage power supply means responsive to said d.c. power output for deriving regulated discrete, isolated d.c. supply outputs;
switching bridge means coupled with said d.c. power output, including discrete, phase designated paired transistor switching stages, each said stage having inputs responsive to selectively applied drive signals to provide a polyphase motor drive at the outputs thereof;
driver means having discrete driver networks, each having a supply input coupled with a select one of said d.c. supply outputs and a drive output coupled with a select said switching bridge means input, each said driver network being responsive to pulse width modulated control signals applied to an input thereof for applying said drive signals to said select switching bridge means input;
control circuit means including:
a pulse width modulation integrated circuit having discrete outputs coupled with selected said driver network inputs and responsive to a signal at first frequency applied to a first input thereof to generate corresponding motor frequency defining pulse width modulated signals at said discrete outputs and responsive to the presence of an enable signal applied to a second input thereof to carry out said signal generation;
oscillator means for generating predetermined frequency signals;
first programmable counter means having a first input coupled for response to said predetermined frequency signals, an output coupled with said integrated circuit first input for applying a said first frequency signal thereto and a multi-position programming input responsive to an applied multi-bit logic signal for effecting the selection of said first frequency; and
processor means having a multi-bit output coupled with said multi-position programming input and responsive to a sensed environmental parameter for deriving and applying said multi-bit logic signal.

23. The control system of claim 22 in which said control circuit means pulse width modulation integrated circuit second input is coupled with said processor means and said processor means is programmed for predetermined removal of said enable signal.

24. The control system of claim 22 in which:
said system includes voltage sensing means responsive to the voltage level of said d.c. power output and a reference level for deriving a power signal in the presence of a substantial equality of said levels; and
said control circuit means is responsive to said power signal to apply said enable signal to said pulse width modulation integrated circuit second input.

25. The control system of claim 24 in which:
said voltage sensing means includes an optical coupler for conveying said power signal to said control circuit means; and each said driver means discrete driver network is coupled with a said pulse width modulation integrated circuit discrete output through an optical coupler.

26. The control system of claim 24 in which said control circuit means includes delay network means for delaying said response to said power signal an interval selected to assure the completion of initialization procedures by said processor means.

27. The control system of claim 22 in which:

said control circuit means pulse width modulation integrated circuit includes a third input responsive to a signal at a second frequency applied thereto for selectively controlling the modulation depth characteristic of said motor frequency defining pulse width modulated signals;

said control circuit means includes second programmable counter means coupled for response to said predetermined frequency signal and having an output coupled with said third input for applying a said second frequency signal thereto, and a multi-position programming input responsive to an applied multi-bit logic signal for effecting the selection of said second frequency signal; and said processor means is coupled with said second programmable counter means multi-position programming input for applying said multi-bit logic signal thereto.

28. A pulse width modulated polyphase inverter for providing drive to an inductive load, comprising:

supply means for providing a high voltage d.c. output;

start-up impedance means coupled with said high voltage d.c. output for selectively dissipating current;

by-pass network means actuable to shunt said start-up impedance means;

high voltage sensing means including comparison network means responsive to the voltage level of said high voltage d.c. output and to the level of a reference voltage for deriving a power signal in the presence of a substantial equality of said levels;

actuator means responsive to said power signal for actuating said by-pass network means;

low voltage power supply means including step down impedance means coupled with said high voltage d.c. output for deriving a d.c output of selectively reduced voltage level, gate controlled pre-regulator circuit means responsive to a reference input for deriving a pre-regulated output, and supply circuit means including:

oscillator means coupled with said pre-regulated output for deriving a time varying output, step down transformer means having a primary winding responsive to said time varying output and having mutually isolated secondary windings for providing first discrete, phase designated time varying supply outputs and a second time varying output, first discrete, mutually isolated low voltage rectifier means coupled with said mutually isolated secondary windings for deriving first discrete, phase designated positive and negative d.c. supply outputs, and second low voltage rectifier means coupled with a said secondary winding for deriving a second d.c. supply output from said second time varying output, first means coupling said second d.c. supply output with said high voltage sensing means to derive said reference voltage and second means coupling said second d.c. supply output with said gate controlled pre-regulator circuit means for deriving said reference input;

switching bridge means coupled with said high voltage d.c. power output, including discrete, phase designated, paired transistor switching stages, each said stage having dual inputs responsive to selectively applied on-drive and off-drive signals to provide a polyphas motor drive at the outputs thereof;

control circuit means for providing discrete, phase designated pulse width modulation control outputs; and driver means having discrete driver networks, each having dual outputs coupled with the said dual inputs of a corresponding one of said transistor switching stages, each said driver network having dual power supply inputs coupled with a corresponding one of said discrete, phase designated positive and negative d.c. supply outputs and responsive to a corresponding said discrete, phase designated pulse width modulation control output to derive said on-drive and off-drive signals for application to said transistor switching stage inputs.

* * * * *